US007591989B2

(12) United States Patent
Smiljanic et al.

(10) Patent No.: US 7,591,989 B2
(45) Date of Patent: Sep. 22, 2009

(54) METHOD AND APPARATUS FOR PRODUCING SINGLE-WALL CARBON NANOTUBES

(75) Inventors: Olivier Smiljanic, Montreal (CA); Barry L. Stansfield, St. Bruno (CA)

(73) Assignee: Institut National de la Recherche Scientifique, Quebec (CA)

( * ) Notice: Subject to any disclaimer, the term of this patent is extended or adjusted under 35 U.S.C. 154(b) by 801 days.

(21) Appl. No.: 10/434,181

(22) Filed: May 9, 2003

(65) Prior Publication Data

US 2003/0211030 A1    Nov. 13, 2003

(30) Foreign Application Priority Data

May 9, 2002    (CA)    ................................. 2385802

(51) Int. Cl.
*D01F 9/12*    (2006.01)
(52) U.S. Cl. .................... 423/447.1; 977/843; 977/844; 423/447.3
(58) Field of Classification Search .............. 423/447.3, 423/447.1; 977/843, 844
See application file for complete search history.

(56) References Cited

U.S. PATENT DOCUMENTS

| | | | |
|---|---|---|---|
| 4,490,229 A | 12/1984 | Mirtich et al. | |
| 4,518,575 A | 5/1985 | Porter et al. | |
| 4,572,813 A | 2/1986 | Arakawa | |
| 4,582,254 A | 4/1986 | Rotolico et al. | |
| 4,640,830 A | 2/1987 | Arakawa | |
| 4,749,557 A | 6/1988 | Yetter et al. | |
| 4,767,608 A | 8/1988 | Matsumoto et al. | |
| 4,816,289 A | 3/1989 | Komatsu et al. | |
| 4,876,078 A | 10/1989 | Arakawa et al. | |
| 5,102,647 A | 4/1992 | Yamada | |
| 5,147,998 A | 9/1992 | Tsantrizos et al. | |
| 5,207,999 A | 5/1993 | Burk et al. | |
| 5,217,747 A | 6/1993 | Tsantrizos et al. | |
| 5,227,038 A | 7/1993 | Smalley et al. | |
| 5,300,203 A | 4/1994 | Smalley | |
| 5,346,683 A | 9/1994 | Green et al. | |
| 5,395,496 A | 3/1995 | Tsantrizos et al. | |
| 5,424,054 A | 6/1995 | Bethune et al. | |
| 5,481,080 A | 1/1996 | Lynum et al. | |
| 5,482,601 A | 1/1996 | Ohshima et al. | |
| 5,486,674 A | 1/1996 | Lynum et al. | |
| 5,493,094 A | 2/1996 | Simmons | |
| 5,510,098 A | 4/1996 | Chow | |
| 5,527,518 A | 6/1996 | Lynum et al. | |
| 5,556,517 A | 9/1996 | Smalley | |
| 5,587,141 A | 12/1996 | Ohshima et al. | |
| 5,591,312 A | 1/1997 | Smalley | |
| 5,593,740 A | 1/1997 | Strumban et al. | |
| 5,611,896 A | 3/1997 | Swanepoel et al. | |
| 5,641,466 A | 6/1997 | Ebbesen et al. | |
| 5,684,218 A | 11/1997 | Webster | |
| 5,744,657 A | 4/1998 | Webster | |
| 5,753,088 A | 5/1998 | Olk | |
| 5,773,834 A | 6/1998 | Yamamoto et al. | |
| 5,788,738 A | 8/1998 | Pirzada et al. | |
| 5,851,507 A | 12/1998 | Pirzada et al. | |
| 5,876,684 A | 3/1999 | Withers et al. | |
| 5,916,642 A | 6/1999 | Chang | |
| 5,985,232 A | 11/1999 | Howard et al. | |
| 5,989,648 A | 11/1999 | Phillips | |
| 5,997,837 A | 12/1999 | Lynum et al. | |
| 6,063,243 A | 5/2000 | Zettl et al. | |
| 6,068,827 A | 5/2000 | Lynum et al. | |

(Continued)

FOREIGN PATENT DOCUMENTS

AU    5335501    10/2001

(Continued)

OTHER PUBLICATIONS

Liu, C. et al., "Hydrogen Storage in Single-Walled Carbon Nanotubes at Room Temperature", *Science*, vol. 286, Nov. 5, 1999, pp. 1127-1129.

(Continued)

*Primary Examiner*—Stuart Hendrickson
(74) *Attorney, Agent, or Firm*—Bereskin & Parr LLP/S E.N.C.H.L., s.r.l.

(57) ABSTRACT

The invention relates to a method for producing single-wall carbon nanotubes. The method of the invention comprises the steps of (a) providing a plasma torch having a plasma tube with a plasma-discharging end; (b) feeding an inert gas through the plasma tube to form a primary plasma; (c) contacting a carbon-containing substance and a metal catalyst with the primary plasma at the plasma-discharging end of the plasma tube, to form a secondary plasma containing atoms or molecules of carbon and atoms of the metal catalyst; and (d) condensing the atoms or molecules of carbon and the atoms of the metal catalyst to form single-wall carbon nanotubes. Alternatively, steps (b) and (c) can be carried out by feeding an inert gas and an inorganic metal catalyst through the plasma tube to form a primary plasma containing atoms of the inorganic metal catalyst and contacting a carbon-containing substance with the primary plasma at the plasma-discharging end of the plasma tube, to form a secondary plasma containing atoms or molecules of carbon and the atoms of metal catalyst. An apparatus for carrying out the method according to the invention is also disclosed.

59 Claims, 8 Drawing Sheets

U.S. PATENT DOCUMENTS

| | | | |
|---|---|---|---|
| 6,083,469 | A | 7/2000 | Leftin |
| 6,099,696 | A | 8/2000 | Schwob et al. |
| 6,149,775 | A | 11/2000 | Tsuboi et al. |
| 6,156,256 | A | 12/2000 | Kennel |
| 6,162,411 | A | 12/2000 | Howard et al. |
| 6,171,451 | B1 | 1/2001 | Miley et al. |
| 6,183,714 | B1 | 2/2001 | Smalley et al. |
| 6,187,206 | B1 | 2/2001 | Bernier et al. |
| 6,221,330 | B1 | 4/2001 | Moy et al. |
| 6,254,940 | B1 | 7/2001 | Pratsinis et al. |
| 6,261,484 | B1 | 7/2001 | Phillips et al. |
| 6,261,532 | B1 | 7/2001 | Ono |
| 6,303,094 | B1 | 10/2001 | Kusunoki et al. |
| 6,331,209 | B1 | 12/2001 | Jang et al. |
| 6,331,690 | B1 | 12/2001 | Yudasaka et al. |
| 6,333,016 | B1 | 12/2001 | Resasco et al. |
| 6,350,488 | B1 | 2/2002 | Lee et al. |
| 6,358,375 | B1 | 3/2002 | Schwob |
| 6,361,861 | B2 | 3/2002 | Gao et al. |
| 8,382,526 | | 5/2002 | Reneker et al. |
| 8,395,197 | | 5/2002 | Detering et al.. |
| 6,426,134 | B1 | 7/2002 | Lavin et al. |
| 6,444,864 | B1 | 9/2002 | Knight et al. |
| 6,455,021 | B1 | 9/2002 | Saito |
| 6,495,114 | B1 | 12/2002 | Debras |
| 6,495,116 | B1 | 12/2002 | Herman |
| 6,518,218 | B1 | 2/2003 | Sun et al. |
| 6,645,455 | B2 | 11/2003 | Margrave et al. |
| 6,683,783 | B1 | 1/2004 | Smalley et al. |
| 6,686,311 | B2 | 2/2004 | Sun et al. |
| 6,692,717 | B1 | 2/2004 | Smalley et al. |
| 6,730,284 | B2 | 5/2004 | Harutyunyan et al. |
| 6,749,827 | B2 | 6/2004 | Smalley et al. |
| 6,752,977 | B2 | 6/2004 | Smalley et al. |
| 6,756,025 | B2 | 6/2004 | Colbert et al. |
| 6,756,026 | B2 | 6/2004 | Colbert et al. |
| 6,761,870 | B1 | 7/2004 | Smalley et al. |
| 6,787,200 | B1 | 9/2004 | Delaunay et al. |
| 6,790,425 | B1 | 9/2004 | Smalley et al. |
| 6,824,755 | B2 | 11/2004 | Colbert et al. |
| 6,827,918 | B2 | 12/2004 | Margrave et al. |
| 6,835,366 | B1 | 12/2004 | Margrave et al. |
| 6,841,002 | B2 | 1/2005 | Kang et al. |
| 6,841,003 | B2 | 1/2005 | Kang et al. |
| 6,841,139 | B2 | 1/2005 | Margrave et al. |
| 6,852,410 | B2 | 2/2005 | Veedu et al. |
| 6,855,301 | B1 | 2/2005 | Rich et al. |
| 6,875,412 | B2 | 4/2005 | Margrave et al. |
| 6,887,291 | B2 | 5/2005 | Alford et al. |
| 6,899,945 | B2 | 5/2005 | Smalley et al. |
| 6,900,264 | B2 | 5/2005 | Kumar et al. |
| 6,913,789 | B2 | 7/2005 | Smalley et al. |
| 6,919,064 | B2 | 7/2005 | Resasco et al. |
| 6,936,233 | B2 | 8/2005 | Smalley et al. |
| 6,936,653 | B2 | 8/2005 | McElrath et al. |
| 6,939,525 | B2 | 9/2005 | Colbert et al. |
| 6,949,237 | B2 | 9/2005 | Smalley et al. |
| 7,303,790 | B2 | 12/2007 | Delaunay et al. |
| 2001/0009693 | A1 | 7/2001 | Lee et al. |
| 2001/0031900 | A1 | 10/2001 | Margrave et al. |
| 2001/0041160 | A1 | 11/2001 | Margrave et al. |
| 2001/0050219 | A1 | 12/2001 | Anazawa et al. |
| 2002/0004028 | A1 | 1/2002 | Margrave et al. |
| 2002/0018745 | A1 | 2/2002 | Herman |
| 2002/0031466 | A1 | 3/2002 | Saito |
| 2002/0046872 | A1 | 4/2002 | Smalley et al. |
| 2002/0048832 | A1 | 4/2002 | Smalley et al. |
| 2002/0068170 | A1 | 6/2002 | Smalley et al. |
| 2002/0084410 | A1 | 7/2002 | Colbert et al. |
| 2002/0086124 | A1 | 7/2002 | Margrave et al. |
| 2002/0088938 | A1 | 7/2002 | Colbert et al. |
| 2002/0090330 | A1 | 7/2002 | Smalley et al. |
| 2002/0090331 | A1 | 7/2002 | Smalley et al. |
| 2002/0090468 | A1 | 7/2002 | Goto et al. |
| 2002/0092963 | A1 | 7/2002 | Colbert et al. |
| 2002/0092964 | A1 | 7/2002 | Colbert et al. |
| 2002/0094311 | A1 | 7/2002 | Smalley et al. |
| 2002/0095968 | A1 | 7/2002 | Smalley et al. |
| 2002/0096834 | A1 | 7/2002 | Colbert et al. |
| 2002/0098135 | A1 | 7/2002 | Smalley et al. |
| 2002/0102193 | A1 | 8/2002 | Smalley et al. |
| 2002/0102194 | A1 | 8/2002 | Smalley et al. |
| 2002/0102196 | A1 | 8/2002 | Smalley et al. |
| 2002/0102201 | A1 | 8/2002 | Colbert et al. |
| 2002/0102203 | A1 | 8/2002 | Smalley et al. |
| 2002/0109086 | A1 | 8/2002 | Colbert et al. |
| 2002/0109087 | A1 | 8/2002 | Colbert et al. |
| 2002/0110513 | A1 | 8/2002 | Margrave et al. |
| 2002/0127162 | A1 | 9/2002 | Smalley et al. |
| 2002/0127169 | A1 | 9/2002 | Smalley et al. |
| 2002/0127171 | A1 | 9/2002 | Smalley et al. |
| 2002/0136683 | A1 | 9/2002 | Smalley et al. |
| 2002/0138881 | A1 | 9/2002 | Smalley et al. |
| 2002/0150524 | A1 | 10/2002 | Smalley et al. |
| 2002/0159943 | A1 | 10/2002 | Smalley et al. |
| 2002/0159944 | A1 | 10/2002 | Smalley et al. |
| 2002/0172767 | A1 | 11/2002 | Grigorian et al. |
| 2002/0197474 | A1 | 12/2002 | Reynolds |
| 2003/0010910 | A1 | 1/2003 | Colbert et al. |
| 2003/0064169 | A1 | 4/2003 | Hong et al. |
| 2003/0066980 | A1 | 4/2003 | Colbert et al. |
| 2003/0075882 | A1 | 4/2003 | Colbert et al. |
| 2003/0082094 | A1 | 5/2003 | Loutfy et al. |
| 2003/0104933 | A1 | 6/2003 | Sun et al. |
| 2003/0104934 | A1 | 6/2003 | Sun et al. |
| 2003/0106998 | A1 | 6/2003 | Colbert et al. |
| 2003/0108478 | A1 | 6/2003 | Hiraoka et al. |
| 2003/0113714 | A1 | 6/2003 | Belcher et al. |
| 2003/0133885 | A1 | 7/2003 | Smalley et al. |
| 2003/0147802 | A1 | 8/2003 | Smalley et al. |
| 2003/0170168 | A1 | 9/2003 | Smalley et al. |
| 2003/0175200 | A1 | 9/2003 | Smalley et al. |
| 2003/0211028 | A1 | 11/2003 | Smalley et al. |
| 2003/0215380 | A1 | 11/2003 | Yang et al. |
| 2003/0216502 | A1 | 11/2003 | Yang et al. |
| 2003/0224114 | A1 | 12/2003 | Yang |
| 2004/0005289 | A1 | 1/2004 | Huang et al. |
| 2004/0009114 | A1 | 1/2004 | Margrave et al. |
| 2004/0013598 | A1 | 1/2004 | McElrath et al. |
| 2004/0022981 | A1 | 2/2004 | Xiadong et al. |
| 2004/0038251 | A1 | 2/2004 | Smalley et al. |
| 2004/0040834 | A1 | 3/2004 | Smalley et al. |
| 2004/0045808 | A1 | 3/2004 | Fabry et al. |
| 2004/0053440 | A1 | 3/2004 | Lai et al. |
| 2004/0149209 | A1 | 8/2004 | Dai et al. |
| 2004/0150312 | A1 | 8/2004 | McElrath et al. |
| 2004/0179989 | A1 | 9/2004 | Height et al. |
| 2004/0188220 | A1 | 9/2004 | Calmia |
| 2004/0197638 | A1 | 10/2004 | McElrath et al. |
| 2004/0223901 | A1 | 11/2004 | Smalley et al. |
| 2004/0234444 | A1 | 11/2004 | Shaffer et al. |
| 2004/0241080 | A1 | 12/2004 | Nagy et al. |
| 2004/0245088 | A1 | 12/2004 | Gardner |
| 2004/0256603 | A1 | 12/2004 | Yakobson et al. |
| 2004/0260753 | A1 | 12/2004 | Kang et al. |
| 2004/0263167 | A1 | 12/2004 | Silva et al. |
| 2004/0265209 | A1 | 12/2004 | Colbert et al. |
| 2005/0002851 | A1 | 1/2005 | McElrath et al. |
| 2005/0025696 | A1 | 2/2005 | Resasco et al. |
| 2005/0042162 | A1 | 2/2005 | Resasco et al. |
| 2005/0074392 | A1 | 4/2005 | Yang et al. |
| 2005/0089467 | A1 | 4/2005 | Grill et al. |
| 2005/0100497 | A1 | 5/2005 | Smalley et al. |
| 2005/0106094 | A1 | 5/2005 | Kondo |

| | | |
|---|---|---|
| 2005/0118090 A1 | 6/2005 | Shaffer et al. |
| 2005/0123467 A1 | 6/2005 | Harutyunyan |
| 2005/0171281 A1 | 8/2005 | Hwang et al. |

FOREIGN PATENT DOCUMENTS

| | | |
|---|---|---|
| CA | 2010887 | 8/1991 |
| CA | 2085133 | 10/1992 |
| CA | 2231367 | 3/1997 |
| CA | 2283502 | 9/1998 |
| CA | 2344180 | 3/2000 |
| CA | 2344577 | 3/2000 |
| CA | 2350099 | 5/2000 |
| CA | 2375887 | 12/2000 |
| CA | 2368043 | 5/2001 |
| CA | 2331278 | 8/2001 |
| CA | 2395243 | 10/2001 |
| CA | 2405176 | 11/2001 |
| CA | 2410934 | 12/2001 |
| CA | 2424969 | 4/2002 |
| CA | 2439314 | 10/2002 |
| CA | 2445169 | 10/2002 |
| CA | 2419941 | 12/2002 |
| CA | 2451080 | 1/2003 |
| CA | 2461898 | 4/2003 |
| CA | 2462067 | 4/2003 |
| CA | 2504214 | 5/2004 |
| CA | 2505996 | 6/2004 |
| CA | 2507992 | 6/2004 |
| CA | 2518848 | 9/2004 |
| CA | 2519610 | 9/2004 |
| EP | 1046613 | 10/2000 |
| EP | 1061043 | 12/2000 |
| EP | 1072693 | 1/2001 |
| EP | 1129990 | 9/2001 |
| JP | H06-56414 | 3/1994 |
| JP | 2737736 | 7/1997 |
| JP | H09-188509 | 7/1997 |
| WO | WO 93/01128 | 1/1993 |
| WO | WO 93/12030 | 6/1993 |
| WO | WO 93/20151 | 10/1993 |
| WO | WO 93/20152 | 10/1993 |
| WO | WO 93/20153 | 10/1993 |
| WO | WO 9323331 | 11/1993 |
| WO | WO 9404461 | 3/1994 |
| WO | WO 94/14899 | 7/1994 |
| WO | 9709272 | 3/1997 |
| WO | WO 97/22556 | 6/1997 |
| WO | WO 99/65821 | 12/1999 |
| WO | WO 01/16023 | 3/2001 |
| WO | WO 01/34518 | 5/2001 |
| WO | WO 01/49599 | 7/2001 |
| WO | WO 01/61719 | 8/2001 |
| WO | WO 0177015 | 10/2001 |
| WO | WO 03038163 | 5/2003 |
| WO | WO 03062146 | 7/2003 |

OTHER PUBLICATIONS

Dresselhaus, K.A. et al., "Hydrogen Adsorption in Carbon Materials", *MRS Bulletin*, Nov. 1999, pp. 45-50.
Menon, M. et al., "Carbon Nanotube "T Junctions": Nanoscale Metal-Semiconductor-Metal Contact Devices", *Phys. Rev. Lett.*, 1997, pp. 4453-4456.
Puretzky, A.A. et al., "Dynamics of single-wall carbon nanotube synthesis by laser vaporization", *App. Phys. A.*, 2000, pp. 153-160.
Smalley, R E. et al., "Catalytic growth of single-wall carbon nanotubes from metal particles", *Chem. Phys. Let.*, 1998, pp. 195-202.
Smiljanic, O. et al., "Gas-phase synthesis of SWNT by an atmospheric pressure plasma jet", *Chem. Phys. Let.*, 2002, pp. 189-193.
Karachevtsev, V.A. et al., "Raman spectroscopy of HiPCO single-walled carbon nanotubes at 300 and 5 K", *Carbon*. 2003. pp. 1567-1574.
An English abstract of CN 1328958 "Preparation of carbon nanometer pipe material and its equipment", Jan. 2, 2002.
An English abstract of JP 9188509 "Production of monolayer carbon nanotube", Jul. 22, 1997.
Smiljanic et al., "Gas Phase Synthesis of SWNT in an Atmospheric Pressure Plasma Jet", Nanotube-2001, International Workshop on the Science and Application of Nanotubes, Jul. 22, 2001, Postdam, Germany.
Harbec, D. et al., Carbon Nanotubes from the Dissociation of C2Cl4 Using a DC Thermal Plasma Torch. Journal of Physics D: Applied Physics, vol. 37, Jul. 14, 2004, pp. 2121-2126.
Andrews, R. et al., Continuous Production of Aligned Carbon Nanotubes: A Step Closer to Commercial Realization, Chemical Physics Letters, vol. 303, Apr. 16, 1999, pp. 467-474.
Shi, Z. et al., Large Scale Synthesis of Single-Wall Carbon Nanotubes by Arc-Discharge Method, Journal of Physics and Chemistry of Solids, vol. 61, 2000, pp. 1031-1036.
Harris, P. J. F., Fullerene-Related Structure of Commercial Glassy Carbons, Philosophical Magazine, vol. 84, No. 29, Oct. 11, 2004, ppp. 3159-3167.
Wei-Fang Du et al., "Investigation of the pore structure of as-prepared and purified HiPco single-walled carbon nanotubes by N2/Ar adsorption implication for H2 storage", Nano Letters, 2002, vol. 2, No. 4, pp. 343-346.
Yang et al., "Charge-discharge characteristics of raw acid-oxidized carbon nanotubes", Electrochemistry Communications 4, 2002, pp. 574-578.
Yang et al., "Effects of doped coper on electrochemical performance of the raw carbon nanotubes anode", Materials Letters 57, 2003, pp. 3160-3166.
Yargeau et al., "The treatment of water-based toxic waste using induction plasma technology", Plasma Chemistry and Plasma Processing, 1999, vol. 19, No. 3, pp. 327-340.
Chun-Ku et al., "Low-power plasma torch method for the produciton of crystalline spherical ceramic particles", J.Mat. Res., 2001, vol. 16, pp. 1256-1265.
Soucy et al., "Heat and mass transfer during in-flight nitridation of molybdenum disilicide powder in an induction plasma reactor", Materials Science and Engineering, A300, 2001, pp. 226-234.
Tanaka et al., "Compositional modification of boron carbide induced by induction plasma treatment", Thin Solid Films 345, 1999, pp. 156-160.
Davies at al., "Experimental study of heat and mass transfer in a high-frequency thermal plasma reactor", IEEE Transactions on Plasma Science, Oct. 1997, vol. 25, No. 5, pp. 1052-1057.
Desilets et al., "Modeling of multicomponent diffusion in high temperature flows", Int. J. Heat Mass Transfer, 1997, Vol. 40, No. 18, pp. 4273-4278.
Rahmane et al., "Analysis on the enthalpy probe technique for thermal plasma diagnostics", Rev.Sci.Instr. 1995, pp. 3424-3431.
Pacheco-Sotelo et al., "Plasma torch ignition by a half bridge resonant converter", IEEE Transactions on Plasma Science, Aug. 1999, vol. 27, No. 4, pp. 1124-1130.
Rahmane et al., "Mass transfer in induction plasma reactors", Int. J. Heat Mass Transfer, 1994, vol. 37, No. 14, pp. 2035-2046.
Scott, "Carbon Coated Nanoparticle Composites Synthesized in an RF Plasma Torch", Mat. Res. Soc. Symp. Proc., 1997, vol. 457, pp. 219-224.
Alexakis et al., "Synthesis of Fullerenes Via the Thermal Plasma Dissociation of Hydrocarbons", Appl. Phys. Lett., 1997, vol. 70, pp. 2102-2104.
Yoshie et al., "Novel Method for C60 Synthesis: A Thermal Plasma at Atmospheric Pressure", Appl. Phys. Lett., 1992, vol. 61, pp. 2782-2783.
Bolouri et al., "Reactor Design and Energy Concepts for a Plasma Process of Acetylene Black Production", Plasma Chemistry and Plasma Processing, 1986, vol. 6, pp. 335-348.
Bolouri et al., "Acetylene Black Production on a Plasma Pilot Plant", ISPC-6, 1983, pp. 247-252.
Fincke et al., "Plasma Pyrolysis of Methane to Hydrogen and Carbon Black", Ind. Eng. Chem. Res., 2002, vol. 41, pp. 1425-1435.
Cota-Sanchez et al., "Production of Carbon Nanostructures Using a HF Plasma Torch", Plasma Technology Center, Dept. of Chem. Eng., Université de Sherbrooke, Qc., Canada and Depart. Chem., University of Warsaw, Poland, pp. 515-520.

Wang et al., "Synthesis of Fullerenes from Carbon Powder by Using High Power Induction Thermal Plasma", Thin Solid Films 390, 2001, pp. 31-36.

Koshio et al., "Metal-Free Production of High-Quality Multi-Wall Carbon Nanotubes, in Which the Innermost Nanotubes Have a Diameter of 0.4 nm", Chemical Physics Letters 356, 2002, pp. 595-600.

Fulcheri et al., "Fullerene Production in a 3-Phase AC Plasma Process", Carbon 38, 2000, pp. 797-803.

An English Abstract of JP Patent Application 7061803 "Production of Fullerene and Carbon Nanotube", Mar. 7, 1995.

Ando et al., "Mass Production of Single-Wall Carbon Nanotubes by the Arc Plasma Jet Method", Chemical Physics Letters 323, 2000, pp. 580-585.

Guo et al., "Catalytic Growth of Single-Walled Nanotubes by Laser Vaporization", Chemical Physics Letters 243, 1995, pp. 49-54.

Flahaut et al., "Synthesis of Single-Walled Carbon Nanutobes Using Binary (Fe, Co, Ni) Alloy Nanoparticles Prepared In Situ by the Reduction of Oxide Solid Solutions", Chemical Physics Letters 300, 1999, pp. 236-242.

Kitiyanan et al., "Controlled Production of Single-Wall Carbon Nanotubes by Catalytic Decomposition of CO on Bimetallic Co-Mo Catalysts", Chemical Physics Letters 317, 2000, pp. 497-503.

Cheng et al., "Large-Scale and Low-Cost Synthesis of Single-Walled Carbon Nanotubes by the Catalytic Pyrolysis of Hydrocarbons", Appl. Phys. Lett., 1998, vol. 72, pp. 3282-3284.

Nikolaev et al., "Gas-Phase Catalytic Growth of Single-Walled Carbon Nanotubes from Carbon Monoxide", Chemical Physics Letters 313, 1999, pp. 91-97.

Klotz et al., "Synthesis and Characterization of Nanoscaled and Nanostructured Carbon Containing Materials Produced by Thermal Plasma Technology", Applied Surface Science 179, 2001, pp. 1-7.

Sen et al., "Metal-Filled and Hollow Carbon Nanotubes Obtained by the Decomposition of Metal-Containing Free Precursor Molecules", Chem. Mater., 1997, pp. 2078-2081.

Satishkumar et al., "Bundles of Aligned Carbon Nanotubes Obtained by the Pyrolysis of Ferrocene-Hydrocarbon Mixtures: Role of the Metal Nanoparticles Produced In Situ", Chemical Physics Letters 307, 1999, pp. 158-162.

Li et al., "Structure and Growth of Aligned Carbon Nanotube Films by Pyrolysis", Chemical Physics Letters 316, 2000, pp. 349-355.

Fulcheri et al., "A 3-Phase A.C. Plasma Process Carbon Black Production from Methane", VDI Berichte Nr. 1166, 1995, pp. 525-532.

Wang et al., "Silicon Inclusion Effect on Fullerene Formation under Induction Thermal Plasma Condition", Thin Solid Films 407, 2002, pp. 72-78.

Cheng et al., "Bulk Morphology and Diameter Distribution of Single-Walled Carbon Nanotubes Synthesized by Catalytic Decomposition of Hydrocarbons", Chemical Physics Letters 289, 1998, pp. 602-610.

Fonseca et al., "Synthesis of Single-and Multi-Wall Carbon Nanutobes Over Supported Catalysts", Appl. Phys.A, 1998, A67, pp. 11-22.

Hernadi et al., "Fe-Catalyzed Carbon Nanotube Formation", Carbon, 1996, vol. 34, pp. 1249-1257.

Jost et al., "Rate-Limiting Processes in the Formation of Single-Wall Carbon Nanotubes: Pointing the Way to the Nanotube Formation Mechanism", J. Phys. Chem., 2002, vol. 106, pp. 2875-2883.

Liu et al., "Synthesis and Characterization of Single-Walled Nanotubes Produced with Ce/Ni as Catalysts", Chemical Physics Letters 320, 2000, pp. 365-372.

Guo et al., "Catalytic Growth of Single-Walled Nanotubes by Laser Vaporization", Chemical Physics Letters 243, 1995, pp. 49-54.

Scott et al., "Growth Mechanism for Single-Wall Carbon Nanotubes in a Laser-Ablation Process", Appl. Phys., 2001, vol. 72, pp. 573-580.

Takizawa et al., "Change of Tube Diameter Distribution of Single-Wall Carbon Nanotubes Induced by Changing the Bimetallic ratio of Ni and Y Catalysts", Chemical Physics Letters 326, 2000, pp. 351-357.

Lijima et al., "Single-Shell Carbon Nanotubes of 1-nm Diameter", Nature, 1993, vol. 363, pp. 603-604.

Huczko et al., "Plasma Synthesis of Nanocarbons", High Temp. Material Processes, 2002, pp. 369-384.

Lange et al., "Studies of Carbon Arc Plasma Doped with Fe and Co/Ni During the Formation of Carbon Nanostructures", Proceedings 14th Int'l Symposium on Plasma Chemistry, 1999, vol. IV, pp. 2241-2246.

Zhang et al., "Single-Wall Carbon Nanutobes: a High Yield of Tubes Through Laser Ablation of a Crude-Tube Target", Chemical Physics Letters 336, 2001, pp. 196-200.

Chen et al., "Carbon Nanotubes: a Future Material of Life", Life, 2000, vol. 49, pp. 105-108.

Tsai et al., "Bias-Enhanced Nucleation and Growth of the Aligned Carbon Nanotubes with Open Ends Under Microwave Plasma Synthesis", Applied Physics Letters, 1999, vol. 74, pp. 3462-3464.

Qin et al., "Growing Carbon Nanotubes by Microwave Plasma-Enhanced Chemical Vapor Deposition", Applied Physics Letters, 1998, vol. 72, pp. 3437-3439.

Okai et al., "Structure of Carbon Nanotubes Grown by Microwave-Plasma-Enhanced Chemical Vapor Deposition", Applied Physics Letters, 2000, vol. 77, pp. 3468-3470.

Conrads et al., "Plasma Generation and Plasma Sources", Plasma Sources Sci. Technol., 2000, pp. 441-454.

Choi et al., "Effect of Surface Morphology of Ni Thin Film on the Growth of Aligned,Carbon Nanotubes by Microwave Plasma-Enhanced Chemical Vapor Deposition", J. Applied Physics, 2000, vol. 88, pp. 4898-4903.

Wang et al., "Nucleation and Growth of Well-Aligned, Uniform-Sized Carbon Nanotubes by Microwave Plasma Chemical Vapor Deposition", Applied Physics Letters, 2001, vol. 78, pp. 4028-4030.

Murakami et al., "Field Emission from Well-Aligned, Patterned, Carbon Nanotube Emitters", Applied Physics Letters, 2000, vol. 76, pp. 1776-1778.

Bower et al., "Plasma-Induced Alignment of Carbon Nanotubes", Applied Physics Letters, 2000, vol. 77, pp. 831-832.

Delzeit et al., "Growth of Multiwall Carbon Nanotubes in an Inductively Coupled Plasma Reactor", J. Applied Physics, 2002, vol. 91, pp. 6027-6033.

Diener et al., "Development of Combustion Synthesis Methods for Fullerenes and SWNTs", NanoSpace 2001 - Exploring Interdisciplinary Frontiers, 2001, p. 40.

Reed, "Induction-Coupled Plasma Torch", J. Of Applied Physics, 1961, vol. 32, pp. 821-824.

Freeman et al., "Energy-Transfer Mechanism and Typical Operating Characteristics for the Thermal rf Plasma Generator", J. of Applied Physics, 1968, vol. 39, pp. 180-190.

Eckert, "Analysis of Thermal Induction Plasmas Dominated by Radial Conduction Losses", J. of Applied Physics, 1970, vol. 41, pp. 1520-1528.

Boulos, "The Inductively Coupled R.F. (radio frequency) Plasma", Pure & Appl. Chem., 1985, vol. 57, pp. 1321-1352.

Boulos, "The Inductively Coupled Radio Frequency Plasma", High Temp. Material Processes, 1997, pp. 17-39.

Huczko et al., "Influence of Fe and Co/Ni on Carbon Arc Plasma and Formation of Fullerenes and Nanotubes", J. Phys. Chem. A 104(46), 2000, pp. 10708-10712.

Boulos, "Radio Frequency Plasma Developments, Scale-up and Industrial Applications", High Temp. Chem. Processes, 1992, pp. 401-411.

An English abstract of JP 2001348215 "Manufacturing method of carbon nanotube and/or fullerene and manufacturing device thereof", Dec. 18, 2001.

An English abstract of JP 2003530235 " Net shape manufacturing using carbon nanotunes", Oct. 14, 2003.

Bethune et al., Cobalt-catalysed growth of carbon nanotubes with single-atomic layer walls:, Nature, 1993, vol. 363, pp. 605-607.

Ebbesen et al., "Large-scale synthesis of carbon nanotubes", Nature, 1992, vol. 358, pp. 220-222.

Journet et al., "Large-scale production of single-walled carbon nanotubes by the electric-arc technique", Nature, 1997, vol. 388, pp. 756-758.

Hubert et al., "An atmospheric pressure waveguide-fed microwave plasma torch: the TIA design", Plasma Sources Sci. Technol., 1994, pp. 584-592.

Sarkissian, A.H., et al. "Characterization of diffused ECR plasma-application to pulsed plasma ion implantation of nitrogen in titanium", Surface and Coatings technology, Jan. 1998, vol. 98, pp. 1336-1340.

Smiljanic et al., "Growth of carbon nanotubes on Ohmically heated carbon paper", Chemical Physics letters, Jul. 20, 2001, vol. 342, pp. 503-509.

Tekna Plasma Torch brochures. No Date.

An English abstract of JP 7061803 "Production of fullerene and carbon nanotube", Mar. 7, 1995.

An English abstract of JP 2003054924 " Method and apparatus of producing fullerene and carbon nanotube", Feb. 28, 2003.

Rahmane et al. "Diffusion phenomena of a cold gas in a thermal plasma stream", Plasma Chemistry and Plasma Processing., 1996, vol. 16, No. 1, pp. 169S-178S.

Philips et al., "Restructuring of alumina particles using a plasma torch", J. Mat. Res., 1999, vol. 14 No. 3, pp. 849-854.

Documents from litigation related to the corresponding Canadian patent application (CA 2,499,850). No Date.

Soucy et al., "Production of carbon nanostructures using a HF plasma torch", Proc. 15th International Symposium on Plasma Chemistry, Orleans, France, 2001, pp. 515-520.

Simard et al., "Recent advances in carbon nanotubes technologies at the National Research Council", Proceedings of the 11th Canadian Hydrogen Conference, 2001, pp. 1-8.

Soucy et al., "Mixing study of the induction plasma reactor: Part II. Radial Injection Mode", Plasma Chemistry and Plasma Processing, 1994, vol. 14., No. 1, pp. 59-71.

Soucy et al., "Mixing study of the induction plasma reactor: Part I. Axial Injection Mode", Plasma Chemistry and Plasma Processing, 1994, vol. 14., No. 1, pp. 43-58.

Soucy et al, "Parametric study of the decomposition of NH3 for an induction plasma reactor design", Plasma Chemistry and Plasma Processing, 1995, vol. 15, No. 4, pp. 693-710.

Soucy et al., "Parametric study of the plasma synthesis of ultrafine silicon nitride powers", Journal of Materials Science, 1995, pp. 2008-2018.

Guddeti et al., "Depolymerization of Polypropylene in an Induction-Coupled Plasma (ICP) Reactor", Ind. Eng. Chem. Res, 2000, 39, 1171-1176.

Guddeti et al., "Depolymerization of Polyethylene Using Induction-Coupled Plasma Technology", Plasma Chemistry and Plasma Processing, 2000, vol. 20, No. 1, 37-64.

Boulos, "Thermal Plasma Processing", IEEE Transactions on Plasma Science, 1991, vol. 19, No. 6, 1078-1089.

Klotz et al., "Synthesis and Characterization of Nanoscaled and Nanostructured Carbon Containing Materials Produced by Thermal Plasma Technology", Applied Surface Science, 2001, 179, 1-7.

Koshio et al., "Metal-free Production of High-quality Multi-wall Carbon Nanotubes, in which the Innermost Nanotubes Have a Diameter of 0,4 nm", Chemical Physics Letters, 2002, 356, 595-600.

Takikawa et al., "Fabrication of Single-walled Carbon Nanotubes and Nanohorns by Means of a Torch Arc in Open Air", Physica B, 2002, 323, 277-279.

Chen et al., "New Method of Carbon Onion Growth by Radio-frequency Plasma-enhanced Chemical Vapor Deposition", Chemical Physics Letters, 2001, 336, 201-204.

Maher Boulos, New Frontiers in Thermal Plasma Processing, Pure & Appl. Chem., 1996, pp. 1007-1010, vol. 68, No. 5, GB. (Relevant pages: All).

A. Czernichowski, High-Frequency Electrodeless Plasmatrons and Their Use in Chemistry and Material Engineering, ICP Information Newsletter, Jul. 1976, pp. 1-46, Sp. Issue No. 1, US. (Relevant pages: Section 3).

J.Y. Guo et al., Induction Plasma Synthesis of Ultrafine SiC Powders from Silicon and CH4, Journal of Materials Science 30, 1995, pp. 5589-5599, CA. (Relevant pages: All).

M. Boulos et al., Fundamentals of Materials Processing Using Thermal Plasma Technology, Short Course, Canadian University-Industry Council on Advanced Ceramics, Oct. 1989, pp. 1-358, CA. (Relevent pages: Sections 3, 5-7).

T. Hussain et al., Synthesis of Ultra-Fine Silicon Nitride in an R.F. Plasma Reactor, ISPC-7 Eindhoven, Jul. 1985, pp. 692-697, GB. (Relevant pages: All).

M. Boulos, New Frontiers in Material Processing Using Thermal Plasma Technology, High Energy Density Technologies in Materials Science, 1990, pp. 49-64, Netherlands. (Relevant pages: All).

M. Boulos, Preparation of Ultrafine Silicon Nitride Powders Using R.F. Plasma Technology, CEA No. 717 U 635, Dec. 1990, pp. 1-90, CA. (Relevant pp. 1-14, 27-36).

F. Gitzhofer, Industion Plasma Synthesis of Ultrafine SiC, Pure & Appl. Chem., 1996, pp. 1113-1120, vol. 68, No. 5, GB. (Relevant pp. 1114-1117).

M.I. Boulos, R.F. Induction Plasma Spraying: State-of-the-Art Review, Journal of Thermal Spray Technology, Mar. 1992, pp. 33-40, vol. I(1). (Relevant pages: Sections 2, 4).

M. Desilets, Mixing Study in an Inductive Plasma Reactor: Comparison Between Model Calculations and Experimental Results, The Canadian Journal of Chemical Engineering, Aug. 1998, pp. 707-716, vol. 76, CA. (Relevant pp. 707-710).

G.Soucy et al., Design of an Induction Plasma Reactor for the Reforming of Aromatic Liquid Wastes, High Temp. Material Processes 2, 1998, pp. 195-206, CA. (Relevant pages: All).

R. Li et al., Modeling of Unsteady Flow Around Accelerating Sphere at Moderate Reynolds Numbers, the Canadian Journal of Chemical Engineering, Dec. 1993, pp. 837-844, vol. 71, CA. (Relevant pp. 837-838).

K. Chen et al., Turbulence in Induction Plasma Modelling, J. Phys. D: Appl. Phys. 27, 1994, pp. 946-952, UK. (Relevant pp. 946-947).

Z. Njah et al., Study of 3-D Mixing of a Cold Jet with a Transverse Plasma Stream, Int. J. Heart Mass Transfer, 1993, pp. 3897-3907, vol. 36, No. 16, GB. (Relevant pp. 3897-3899 and 3901-3906).

Z. Njah et al., Mathematical Modelling of the 3-D Mixing in an Induction Plasma Reactor, Int. J. Heart Mass Transfer, 1993, pp. 3909-3919, vol. 36, No. 16, GB. (Relevant pp. 3909-3911).

E. Bergeron et al., Reforming of Toxic Liquid Wastes in an Induction Plasma Reactor, Plasma Technology Research Center (CRTP), Dept. of Chem. Engineering, 1997, pp. 417-424, CA. (Relevant pp. 417-420).

M. Rahmane et al., Heat and Mass Transfer Under Thermal Plasma Conditions, Recent Res. Devel. Heat, Mass & Momentum Transfer, 1999, pp. 103-120, vol. 2. (Renevant pp. 103-105 and 108).

T. Yoshida et al., Characterization of a Hybrid Plasma and its Application to a chemical Synthesis, J. Appl. Phys.,Feb. 1983, pp. 640-646, vol. 54, No. 2, USA. Relevant pp. 640-641, 644-646).

M. El-Hage et al., A Turbulent Flow Model for the rf Inductively Coupled Plasma, J. Appl. Phys., Jun. 1989, pp. 4178-4185, vol. 65 (11), USA. (Relevant pages: All).

X. Fan et al., Journal of Thermal Spray Technology, Jun. 1998, pp. 247-253, vol. 7(2). (Relevant pages: All).

X. Chen et al., Modeling of RF Plasma Torch with a Metallic Tube Inserted for Reactant Injection, Plasma Chemistry & Plasma Processing, 1991, pp. 103-128, vol. 11, No. 1. (Relevant pp. 103-104).

R. Ye et al., Turbulence Phenomena in the Radio Frequency Induction Plasma Torch, Int'l Journal of Heat and Mass Transfer, 1999, pp. 1585-1595, vol. 42. (Relevant sections: 1, 3-5).

J.Y. Guo et al., Effects of Process Parameters on Ultrafine SiC Synthesis Using Induction Plasmas, Plasma Chemistry and Plasma Processing, 1997, pp. 219-249, vol. 17, No. 2. (Relevant pp. 219, 224-228, 234-236, 241-245).

R. Sen et al., Carbon Nanotubes by the Metallocene Route, Chemical Physics Letters, Mar. 1997, pp. 276-280, vol. 267. (Relevant pages: All).

Nikkiso Co., A Continuous Process for Producing Carbon Nanotubes, Chemical Engineering, Dec. 2001, p. 19. (Relevant pages: Sections 1-2).

Y. Saito, Nanoparticles and Filled Nanocapsules, Carbon (Elsevier Science Ltd.), 1995, pp. 979-988, vol. 33, No. 7, GB. (Relevant pages: Sections 1, 2, 4).

C. Kiang et al., Catalytic Effects of Heavy Metals on the Growth of Carbon Nanotuves and Nanoparticles, J. Phys. Chem. Solids, 1996, pp. 35-39, vol. 57, No. 1, GB. (Relevant pages: All).

A.G. Rinzler et al., Large-Scale Purification of Single-Wall Carbon Nanotubes: Process, Product, and Characterization, Appl. Phys. A., 1998, pp. 29-37, vol. 67. (Relevant pages: Section 1).

M. Holzinger et al., A New Purification Method for Single-Wall Carbon Nanotubes, Appl. Phys. A, 2000, pp. 599-602, vol. 70. (Relevant pages: All).

An English Abstract of DE19946182, Production of Carbon Nanotubes Used in Microelectronics Comprises Focusing Laser Pulses Onto Surface of Carbon-Containing Material, vaporizing and Decomposing Carbon-Containing Molecules and Growing Carbon Nanotubes, Mar. 2001, Forschungsverbund Berlin EV (DE). (Relevant pages: All).

An English Abstract of RU2146648, Method of Preparing Carbon Nanotubes, Mar. 2000, Institut Kataliza Im. G.K. Boreskova SO RAN (RU). (Relevant pages: All).

A. Czernichowski et al., High-Frequency Electrodeless Plasmatrons and Their Use in Chemistry and Material Engineering, ICP Information Newsletter, Jul. 1976, pp. 1-46, vol. 2, Sp. Issue 1, U.S.A. (Relevant pp. 25-40).

FIG_2

FIG_3

FIG_4

METHOD AND APPARATUS FOR PRODUCING SINGLE-WALL CARBON NANOTUBES

FIELD OF THE INVENTION

The present invention relates to improvements in the field of carbon nanotube production. More particularly, the invention relates to an improved method and apparatus for producing single-wall carbon nanotubes.

BACKGROUND OF THE INVENTION

Carbon nanotubes are available either as multi-wall or single-wall nanotubes. Multi-wall carbon nanotubes have exceptional properties such as excellent electrical and thermal conductivities. They have applications in numerous fields such as storage of hydrogen (C. Liu, Y. Y. Fan, M. Liu, H. T. Cong, H. M. Cheng, M. S. Dresselhaus, Science 286 (1999), 1127; M. S. Dresselhaus, K. A Williams, P. C. Eklund, MRS Bull. (1999), 45) or other gases, adsorption heat pumps, materials reinforcement or nanoelectronics (M. Menon, D. Srivastava, Phy. Rev. Lett. 79 (1997), 4453). Single-wall carbon nanotubes, on the other hand, possess properties that are significantly superior to those of multi-wall nanotubes. However, single-wall carbon nanotubes are available only in small quantities since known methods of production do not produce more than few grams per day of these nanotubes. For any industrial application such as storage or material reinforcement, the amount of single-wall carbon nanotubes produced must be at least a few kilograms per day.

Nowadays, the most popular methods for producing single-wall carbon nanotubes are laser ablation, electric arc and chemical vapor deposition (CVD). The two first methods are based on the same principal: local evaporation of a graphite target enriched with a metal catalyst and subsequent condensation of the vapor to form nanotubes (A. A. Puretzky, D. B. Geohegan, S. J. Pennycook, Appl. Phys. A 70 (2000), 153). U.S. Pat. No. 6,183,714 discloses a method of making ropes of single-wall carbon nanotubes using a laser pulse to produce a vapor containing carbon and one or more Group VIII transition metals. U.S. Pat. No. 5,424,054 discloses a process for producing hollow carbon fibers having wall consisting essentially of a single layer of carbon atoms using an electric arc. The process involves contacting carbon vapor with cobalt vapor under specific conditions, and is thus limited to the use of cobalt vapor.

Although the above methods are relatively efficient for the transformation of carbon into nanotubes, they have inherent drawbacks. The vaporisation of graphite is not energetically advantageous since 717 kJ are required to evaporate one mole of carbon. Therefore, the production of single-wall carbon nanotubes via laser ablation and electric arc consumes a lot of energy for small quantities of nanotubes produced. Moreover, these processes are non-continuous since they must be stopped for renewing the source of carbon once the graphite has been consumed.

In the CVD method as well as in the other two methods described above, the metal catalyst plays a key role in the synthesis of the nanotubes. For example, in the CVD method, the carbon-containing gas is decomposed by the particles of metal catalyst on which the nanotubes form. The CVD method suffers from a major drawback since the encapsulation of the catalyst particles by carbon stops the growth of the nanotubes (R. E. Smalley et al. Chem. Phys. Lett. 296 (1998), 195). In addition, due to the non-selectivity of the method, nanotubes having two, three or multi-walls are obtained at the same time as the single-wall nanotubes.

A promising method for the production of single-wall carbon nanotubes involves the use of a plasma torch for decomposing a mixture of carbon-containing substance and a metal catalyst and then condensing the mixture to obtain single-wall carbon nanotubes. This method has been recently described by O. Smiljanic, B. L. Stansfield, J. -P. Dodelet, A. Serventi, S. Dësilets, in Chem. Phys. Lett. 356 (2002), 189 and showed encouraging results. Such a method, however, has an important drawback since a premature extinction of the plasma torch occurs due to a rapid formation of carbon deposit in the torch. This method is therefore non-continuous and requires removal of the carbon deposit. Thus, large quantities of single-wall carbon nanotubes cannot be produced.

SUMMARY OF THE INVENTION

It is therefore an object of the present invention to overcome the above drawbacks and to provide a method and apparatus for the continuous production of single-wall carbon nanotubes in large quantities.

According to a first aspect of the invention, there is provided a method for producing single-wall carbon nanotubes, comprising the steps of:

a) providing a plasma torch having a plasma tube with a plasma-discharging end;

b) feeding an inert gas through the plasma tube to form a primary plasma;

c) contacting a carbon-containing substance and a metal catalyst with the primary plasma at the plasma-discharging end of the plasma tube, to form a secondary plasma containing atoms or molecules of carbon and atoms of metal catalyst; and d) condensing the atoms or molecules of carbon and the atoms of metal catalyst to form single-wall carbon nanotubes.

According to a second aspect of the invention, there is provided a method for producing single-wall carbon nanotubes, comprising the steps of:

a) providing a plasma torch having a plasma tube with a plasma-discharging end;

b) feeding an inert gas and an inorganic metal catalyst through the plasma tube to form a primary plasma containing the atoms of metal catalyst;

c) contacting a carbon-containing substance with the primary plasma at the plasma-discharging end of said plasma tube, to form a secondary plasma containing atoms or molecules of carbon and the atoms of metal catalyst; and d) condensing the atoms or molecules of carbon and the atoms of metal catalyst to form single-wall carbon nanotubes.

According to a third aspect of the invention, there is provided an apparatus for producing single-wall carbon nanotubes, which comprises:

a plasma torch having a plasma tube for receiving an inert gas so as to form a primary plasma, the plasma tube having a plasma-discharging end;

a feeder for directing a carbon-containing substance and a metal catalyst towards the primary plasma so that the carbon-containing substance and the metal catalyst contact the primary plasma at the plasma-discharging end of the plasma tube, to thereby form a secondary plasma containing atoms or molecules of carbon and the atoms of the metal catalyst; and a condenser for condensing the atoms or molecules of carbon and the atoms of the metal catalyst to form single-wall carbon nanotubes.

According to a fourth aspect of the invention, there is provided an apparatus for producing single-wall carbon nanotubes, which comprises:

a plasma torch having a plasma tube for receiving an inert gas and an inorganic metal catalyst so as to form a primary plasma containing atoms of the metal catalyst, the plasma tube having a plasma-discharging end;

a feeder for directing a carbon-containing substance towards the primary plasma so that the carbon-containing substance contacts the primary plasma at the plasma-discharging end of the plasma tube, to thereby form a secondary plasma containing atoms or molecules of carbon and the atoms of the metal catalyst; and a condenser for condensing the atoms or molecules of carbon and the atoms of the metal catalyst to form single-wall carbon nanotubes.

Applicant has found quite surprisingly that by feeding the carbon-containing substance separately from the inert gas used to generate the primary plasma so that the carbon-containing substance contacts the primary plasma at the plasma-discharging end of the plasma tube to form the aforesaid secondary plasma, there is no undesirable formation of carbon deposit adjacent the plasma-discharging end of the plasma tube. Thus, no premature extinction of the plasma torch.

The term "carbon-containing substance" as used herein refers to a substance which contains carbon atoms. Preferably, such a substance does not contain nitrogen atoms. The carbon-containing substance can be a solid, a liquid or a gas.

The expression "organometallic complex" as used herein refers to a compound in which there is a bonding interaction (ionic or covalent, localized or delocalized) between one or more carbon atoms of an organic group or molecule with a main group, transition, lanthanide, or actinide metal atom or atoms.

The expression "rapid condensation" as used herein refers to a condensation which occurs at a rate of at least $10^5$ K/second.

DETAILED DESCRIPTION OF THE INVENTION

In the method according to the first aspect of the invention, step (c) can be carried out by separately directing the carbon-containing substance and the metal catalyst towards the primary plasma. The carbon-containing substance can be in admixture with a carrier gas. Preferably, the carbon-containing substance is in liquid or gaseous phase and the carbon-containing substance in liquid or gaseous phase flows along a helical path prior to contacting the primary plasma. The carbon-containing substance in liquid or gaseous phase is preferably in admixture with a carrier gas. It is also possible to use a carbon-containing substance in solid phase, in admixture with a carrier gas; such a mixture preferably flows along a helical path prior to contacting the primary plasma. The metal catalyst can also be in admixture with a carrier gas. When use is made of a metal catalyst in liquid or gaseous phase, such a metal catalyst preferably flows along a helical path prior to contacting the primary plasma. The metal catalyst in liquid or gaseous phase is preferably in admixture with a carrier gas. It is also possible to use a metal catalyst in solid phase, in admixture with a carrier gas; such a mixture preferably flows along a helical path prior to contacting the primary plasma.

Step (c) of the method according to the first aspect of the invention can also be carried out by directing a mixture of the carbon-containing substance and the metal catalyst towards the primary plasma. The latter mixture can be in admixture with a carrier gas. Preferably, the carbon-containing substance and the metal catalyst are in liquid or gaseous phase and the latter two flow along a helical path prior to contacting the primary plasma. The carbon-containing substance and the metal catalyst in liquid or gaseous phase are preferably in admixture with a carrier gas. It is also possible to use the carbon-containing substance and the metal catalyst in solid phase, in admixture with a carrier gas; such a mixture preferably flows along a helical path prior to contacting the primary plasma.

The metal catalyst used in the method according to the first aspect of the invention is preferably an organometallic complex. It is also possible to use, as a metal catalyst, an inorganic metal complex or an inorganic metal catalyst comprising at least one metal in metallic form. Examples of suitable metal catalyst include those comprising at least one metal selected from the group consisting of Fe, Ru, Co, Rh, Ir, Ni, Pd, Pt, Y, La, Ce, Mn, Li, Pr, Nd, Tb, Dy, Ho, Er, Lu and Gd. The metal is preferably iron.

The metal catalyst can also comprise cobalt and at least one metal selected from the group consisting of Ni, Fe, Y, Pt, Mo, Cu, Pb and Bi. Alternatively, the metal catalyst can comprise nickel and at least one metal selected from the group consisting of Fe, Y, Lu, Pt, B, Ce, Mg, Cu and Ti.

Ferrocene, iron (II) phthalocyanine, iron in metallic form, iron pentacarbonyl and mixtures thereof can be used as suitable metal catalyst. Ferrocene is preferred.

In the method according to the first aspect of the invention, it is possible to use the inert gas in admixture with an inorganic metal catalyst which may be the same or different than the one used in step (c).

In the method according to the second aspect of the invention, step (c) can be carried out by directing the carbon-containing substance towards the primary plasma. The carbon-containing substance can be in admixture with a carrier gas. Preferably, the carbon-containing substance is in liquid or gaseous phase and the carbon-containing substance in liquid or gaseous phase flows along a helical path prior to contacting the primary plasma. The carbon-containing substance in liquid or gaseous phase is preferably in admixture with a carrier gas. It is also possible to use a carbon-containing substance in solid phase, in admixture with a carrier gas; such a mixture preferably flows along a helical path prior to contacting the primary plasma.

The inorganic metal catalyst used in the method according to the second aspect of the invention can be an inorganic metal complex or at least one metal in metallic form. Preferably, the inorganic metal catalyst comprises at least one metal selected from the group consisting of Fe, Ru, Co, Ph, Ir, Ni, Pd, Pt, Y, La, Ce, Mn, Li, Pr, Nd, Tb, Dy, Ho, Er, Lu and Gd. The metal is preferably iron. The inorganic metal catalyst can also comprise cobalt and at least one metal selected from the group consisting of Ni, Fe, Y, Pt, Mo, Cu, Pb and Bi. Alternatively, the inorganic metal catalyst can comprise nickel and at least one metal selected from the group consisting of Fe, Y, Lu, Pt, B, Ce, Mg, Cu and Ti.

The carbon-containing substance used in the method according to the first or the second aspect of the invention can be a carbon-containing gas, a carbon-containing liquid or a carbon-containing solid. It is also possible to use a mixture of a carbon-containing gas and a carbon-containing liquid, a mixture of a carbon-containing gas and a carbon-containing solid, mixture of a carbon-containing liquid and a carbon-containing solid or a mixture of a carbon-containing gas, a carbon-containing liquid and a carbon-containing solid. Preferably, the carbon-containing gas is a $C_1$–$C_4$ hydrocarbon such as methane, ethane, ethylene, acetylene, propane, propene, cyclopropane, allene, propyne, butane, 2-methylpropane, 1-butene, 2-butene, 2-methylpropene, cyclobutane, methylcyclopropane, 1-butyne, 2-butyne, cyclobutene, 1,2-butadiene, 1,3-butadiene or 1-buten-3-yne or a mixture thereof. When commercial acetylene is used, care should be taken to filter such a gas in order to remove impurities. The carbon-containing liquid is preferably a $C_5$–$C_{10}$ hydrocarbon. Alternatively, the carbon-containing liquid can be selected from the group consisting of pentane, hexane, cyclohexane, heptane, benzene, toluene, xylene or styrene or mixtures thereof. The carbon-containing solid can be graphite, carbon black, norbornylene, naphthalene, anthracene, phenanthrene, polyethylene, polypropylene, or polystyrene or mixtures thereof. Graphite is preferred. More preferably, the graphite is in the form of a nano-powder.

The inert gas used in the method according to the first or second aspect of the invention can be helium, argon or a mixture thereof. Argon is preferred. A further inert gas can be injected in the plasma torch and directed towards the primary and secondary plasmas. A cooling inert gas is preferably injected downstream of the secondary plasma; the cooling inert gas can be helium, argon or a mixture thereof. The cooling inert gas assists in providing a temperature gradient. The aforementioned carrier gas can be helium, argon, hydrogen or hydrogen sulfide or a mixture thereof. Argon is preferably used as carrier gas.

According to a preferred embodiment, the metal catalyst and the carbon-containing substance are used in an atomic ratio metal atoms/carbon atoms of about 0.01 to about 0.06. More preferably, the atomic ratio metal atoms/carbon atoms is about 0.02.

Step (d) of the method according to the first or second aspect of the invention is preferably carried out to provide a temperature gradient permitting rapid condensation of the atoms or molecules of carbon and the atoms of metal catalyst. Preferably, the temperature gradient is provided by directing the atoms or molecules of carbon and the atoms of metal catalyst through an oven disposed downstream of the plasma tube in spaced relation thereto, the oven being heated at a predetermined temperature. The predetermined temperature can be comprised between 500 and 1800° C. and preferably between 800 and 950° C. A temperature of about 900° C. is preferred. Such a temperature of about 900° C. is also particularly preferred when the metal catalyst comprises iron. The single-wall carbon nanotubes produced can be collected in a trap such as an electrostatic trap.

In the apparatus according to the third aspect of the invention, the feeder preferably comprise a first conduit for directing the carbon-containing substance towards the primary plasma and a second conduit for directing the metal catalyst towards the primary plasma. Preferably, the first and second conduits each have a discharge end disposed adjacent the plasma-discharging end of the plasma tube. Alternatively, the feeder can comprise a single conduit for directing a mixture of the carbon-containing substance and the metal catalyst towards the primary plasma. In such a case, the single conduit preferably has a discharge end disposed adjacent the plasma-discharging end of the plasma tube. In a particularly preferred embodiment, the single conduit is disposed inside the plasma tube and extends substantially coaxially thereof.

In the apparatus according to the fourth aspect of the invention, the feeder preferably comprises a single conduit for directing the carbon-containing substance towards the primary plasma. Preferably, the conduit has a discharge end disposed adjacent the plasma-discharging end of the plasma tube. In a particularly preferred embodiment, the conduit is disposed inside the plasma tube and extends substantially coaxially thereof.

In the apparatus according to the third or fourth aspect of the invention, the condenser preferably comprise an oven disposed downstream of the plasma tube in spaced relation thereto, and a heat source for heating the oven to provide a temperature gradient permitting rapid condensation of the atoms or molecules of carbon and the atoms of metal catalyst. Preferably, a heat-resistant tubular member having a plasma-receiving end extends through the oven with the plasma-receiving end disposed upstream of the plasma-discharging end of the plasma tube. An injector is provided for injecting a cooling inert gas into the tubular member, downstream of the secondary plasma; the cooling inert gas assists in providing the temperature gradient. The heat-resistant tubular member can be made of quartz or boron nitride. The apparatus can be provided with a trap for collecting single-wall carbon nanotubes produced. Preferably, the trap is an electrostatic trap. The apparatus can also be provided with a cooling system disposed about the plasma tube and extends substantially coaxially thereof. Preferably, the apparatus comprises a Faraday shield made of a conductive material for preventing emission of electromagnetic radiations outside of the apparatus.

Where the apparatus according to the third or fourth aspect of the invention has the aforementioned conduit disposed inside the plasma tube and extending substantially coaxially thereof, the apparatus preferably includes another heat-resistant tubular member disposed about the plasma tube and extending substantially coaxially thereof, and an injector for injecting a further inert gas between the plasma tube and the tubular member to prevent undesirable formation of carbon deposit adjacent the plasma-discharging end of the plasma tube. The latter heat-resistant tubular member can also be made of quartz or boron nitride.

BRIEF DESCRIPTION OF THE DRAWINGS

Further features and advantages of the invention will become more readily apparent from the following description of preferred embodiments as illustrated by way of examples in the appended drawings wherein.

DESCRIPTION OF PREFERRED EMBODIMENTS

Figure 1:
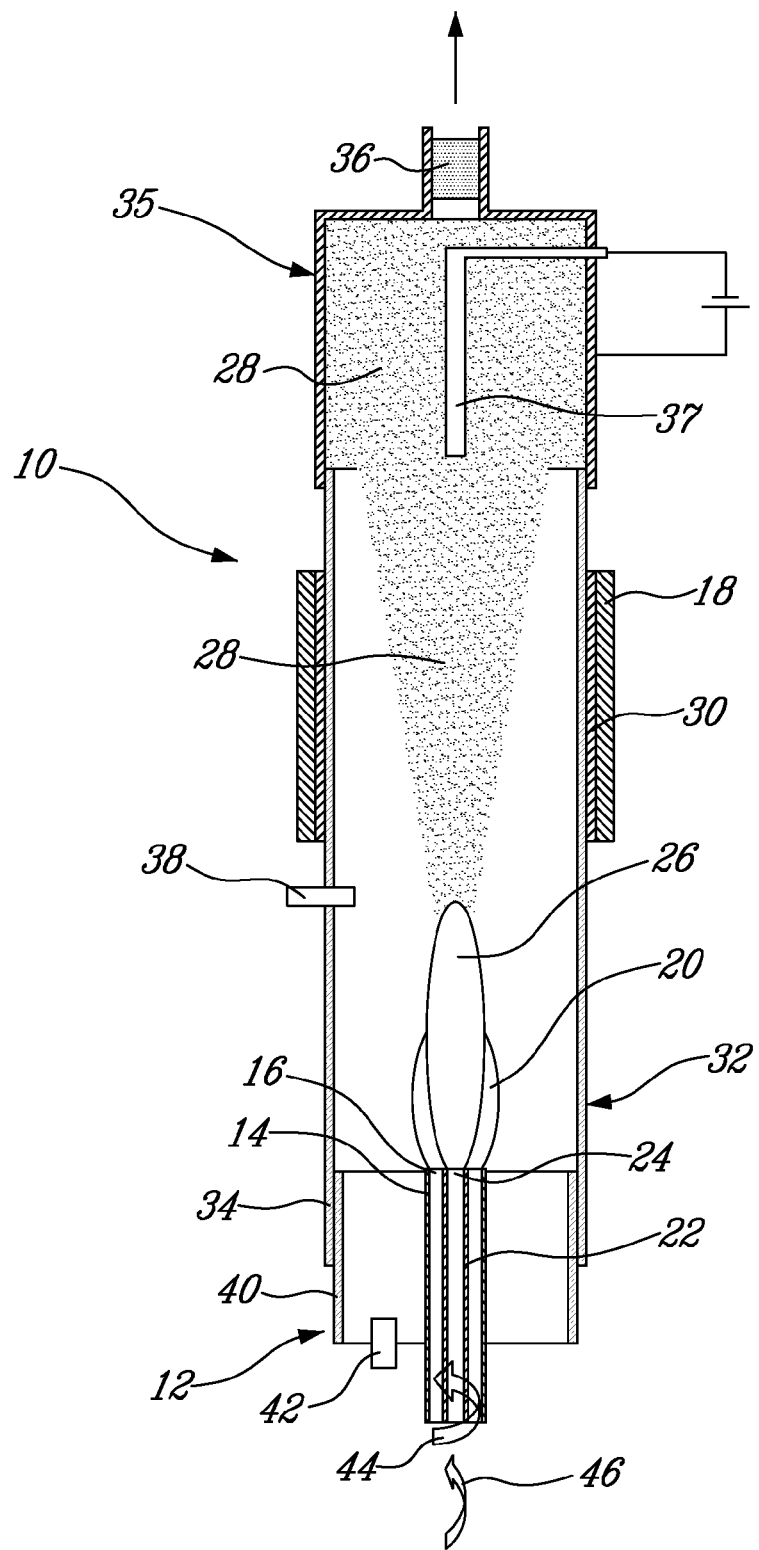
FIG. 1 is a schematic, sectional elevation view of an apparatus for producing single-wall carbon nanotubes, according to a first preferred embodiment of the invention.

Referring first to FIG. 1, there is shown an apparatus 10 for producing single-wall carbon nanotubes, which comprises a plasma torch 12 having a plasma tube 14 with a plasma-discharging end 16, and an oven 18 disposed downstream of the plasma tube 14 in spaced relation thereto. The plasma tube 14 is adapted to receive an inert gas for activation by electromagnetic radiation generated from a source (not shown) so as to form a primary plasma 20. The electromagnetic radiations are propagated on the plasma tube 14 so as to maintain the primary plasma 20. The primary plasma 20 comprises ionized atoms of the inert gas. A feed conduit 22 having a discharge end 24 is arranged inside the plasma tube 14 and extends substantially coaxially thereof. The discharge end 24 of the feed conduit 22 is disposed adjacent the plasma discharging end 16 of the plasma tube 14. The feed conduit 22 serves to direct a carbon-containing substance, such as a carbon-containing gas, and a metal catalyst towards the primary plasma 20 so that the carbon-containing substance and the metal catalyst contact the primary plasma 20 at the plasma-discharging end 16 of the plasma tube 14, whereby to form a secondary plasma 26 containing atoms or molecules of carbon and the atoms of metal catalyst. The carbon-containing gas is preferably ethylene or methane.

The oven 18 serves to condense the atoms or molecules of carbon and atoms of metal catalyst to form single-wall carbon nanotubes 28. A heat source 30 is provided for heating the oven 18 to generate a temperature gradient permitting rapid condensation of the atoms or molecules of carbon and the atoms of metal catalyst. A heat-resistant tubular member 32 having a plasma-receiving end 34 extends through the oven 18, the plasma-receiving end 34 being disposed upstream of the plasma-discharging end 16 of the plasma tube 14. An electrostatic trap 35 comprising a filter 36 and a rod 37 is extending downstream of oven 18. The deposit of single-wall carbon nanotubes 28 occurs on the heat-resistant member 32 upstream and downstream of the oven 18, as well as inside of the trap 35. The filter 36 traps some of the fine particles (not shown) generated during the formation of single-wall carbon nanotubes 28 and reduces the emission of fine particles outside of the apparatus. The electrostatic trap 35 permits a more efficient recovery of the single-wall nanotubes produced by the apparatus 10. The apparatus further includes a gas injector 38 for injecting a cooling inert gas into the tubular member 32, downstream of the secondary plasma 26. The cooling inert gas assists in providing the temperature gradient. Another heat-resistant tubular member 40 is disposed about the plasma tube 14 and extends substantially coaxially thereof, the tubular member 40 being fixed to the tubular member 32 and supporting same. Another gas injector 42 is provided for injecting a further inert gas between the plasma tube 14 and the tubular member 40 to prevent undesirable formation of carbon deposit adjacent the plasma-discharging end 16 of the plasma tube 14. The plasma tube 14 is also provided with a cooling system (not shown), which preferably uses water. The apparatus 10 further comprises a Faraday shield (not shown) made of a conductive material, preferably aluminium.

The inert gas flows through the plasma tube 14 along a helical path represented by the arrow 44. Similarly, the carbon-containing gas and the metal catalyst, optionally in admixture with a carrier gas, flow through the feed conduit 22 along a helical path represented by the arrow 46. The metal catalyst which is fed through the conduit 22 can be either an organometallic complex such as ferrocene, or an inorganic metal catalyst such as iron in metallic form. Instead of feeding the metal catalyst through the conduit 22, it is possible to feed only the carbon-containing gas through the conduit 22 and to feed the metal catalyst in admixture with the inert gas through the plasma tube 14. In such a case, the metal catalyst must be an inorganic metal catalyst to prevent undesirable formation of carbon deposit adjacent the plasma-discharging end 16 of the plasma tube 14. It is also possible to feed the inert gas and an inorganic metal catalyst through the plasma tube 14 and to feed the carbon-containing gas in admixture with an organometallic complex or an inorganic metal catalyst through the conduit 22.

Figure 2:
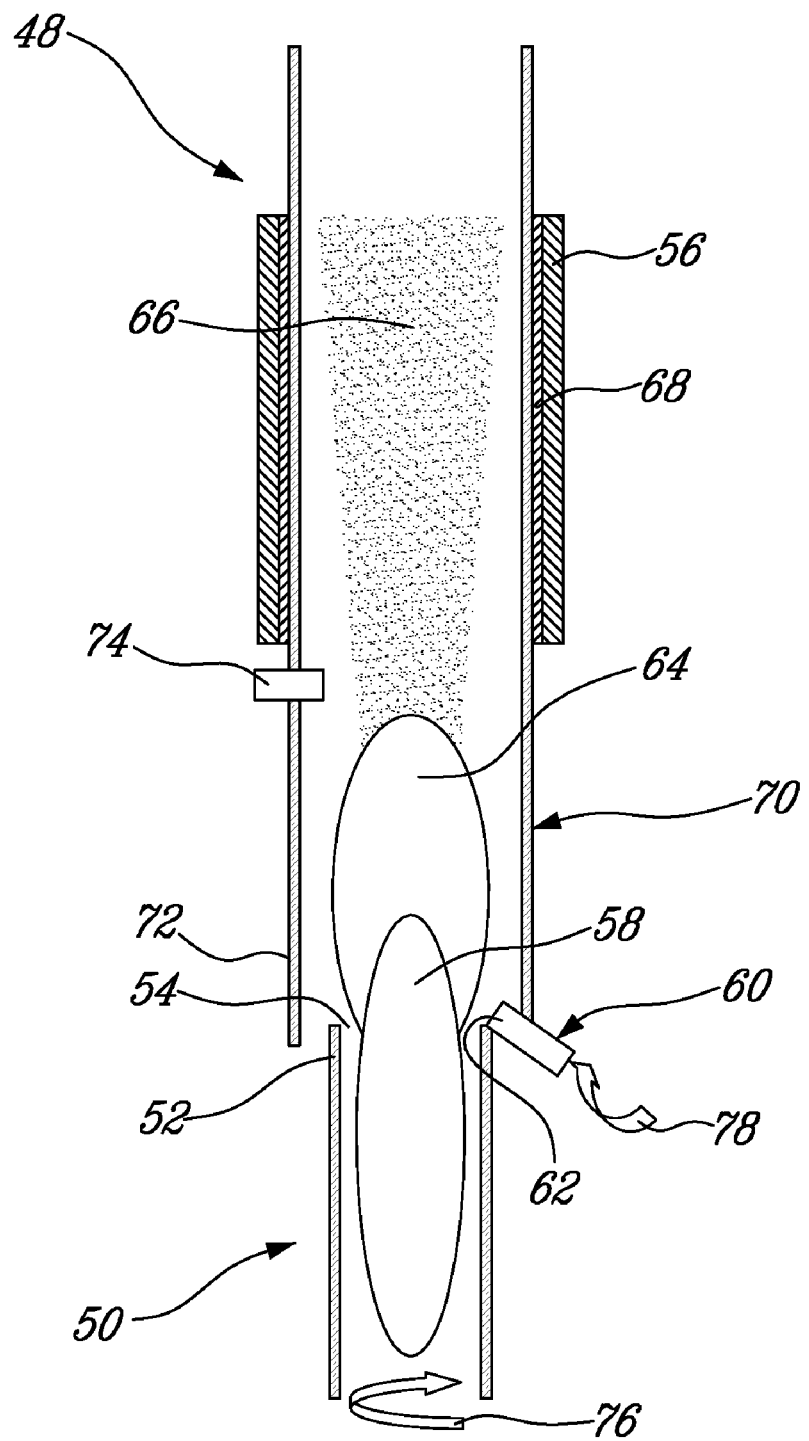
FIG. 2 is a schematic, sectional elevation view of an apparatus for producing single-wall carbon nanotubes, according to a second preferred embodiment of the invention.

FIG. 2 illustrates another apparatus 48 for producing single-wall carbon nanotubes, which comprises a plasma torch 50 having a plasma tube 52 with a plasma-discharging end 54, and an oven 56 disposed downstream of the plasma tube 52 in spaced relation thereto. The plasma tube 52 is adapted to receive an inert gas for activation by electromagnetic radiation generated from a source (not shown) so as to form a primary plasma 58. A feed conduit 60 having a discharge end 62 disposed adjacent the plasma-discharging end 54 of the plasma tube 52 is provided for directing a carbon-containing substance, such as a carbon-containing gas, and a metal catalyst towards the primary plasma 58. The carbon-containing substance and the metal catalyst discharged from the feed conduit 60 contact the primary plasma 58 at the plasma-discharging end 54 of the plasma tube 52, thereby forming a secondary plasma 64 containing atoms or molecules of carbon and the atoms of metal catalyst. The carbon-containing gas is preferably ethylene or methane. Although only one feed conduit 60 is shown in FIG. 2, it is possible to have a plurality of such conduits disposed symmetrically about the plasma tube 52. The plasma tube 52 is also provided with a cooling system (not shown), which preferably uses water. The apparatus 48 further comprises a Faraday shield (not shown) made of a conductive material, preferably aluminium.

The oven 56 serves to condense the atoms or molecules of carbon and the atoms of metal catalyst to form single-wall carbon nanotubes 66. A heat source 68 is provided for heating the oven 56 to generate a temperature gradient permitting rapid condensation of the atoms or molecules of carbon and the atoms of metal catalyst. A heat-resistant tubular member 70 having a plasma-receiving end 72 extends through the oven 56, the plasma-receiving end 72 being disposed upstream of the plasma-discharging end 54 of the plasma tube 52. The apparatus further includes a gas injector 74 for injecting a cooling inert gas into the tubular member 70, downstream of the secondary plasma 64. The cooling inert gas assists in providing the temperature gradient. The deposit of single-wall carbon nanotubes 66 occurs on the heat-resistant tubular member 70 upstream and downstream of the oven 56.

The inert gas flows through the plasma tube 52 along a helical path represented by the arrow 76. Similarly, the carbon-containing gas and the metal catalyst, optionally in admixture with a carrier gas, flow through the conduit 60 along a helical path represented by the arrow 78. The metal catalyst which is fed through the conduit 60 can be either an organometallic complex such as ferrocene, or an inorganic metal catalyst such as iron. Instead of feeding the metal catalyst through the conduit 60, it is possible to feed only the carbon-containing gas through the conduit 60 and to feed the metal catalyst in admixture with the inert gas through the plasma tube 52. In such a case, the metal catalyst must be an inorganic metal catalyst to prevent undesirable formation of carbon deposit adjacent the plasma-discharging end 54 of the plasma tube 52. It is also possible to feed the inert gas and an inorganic metal catalyst through the plasma tube 52 and to feed the carbon-containing gas in admixture with an organometallic complex or an inorganic metal catalyst through the conduit 60. Optionally, the apparatus 48 can be provided with the electrostatic trap 35 illustrated in FIG. 1.

Figure 3:
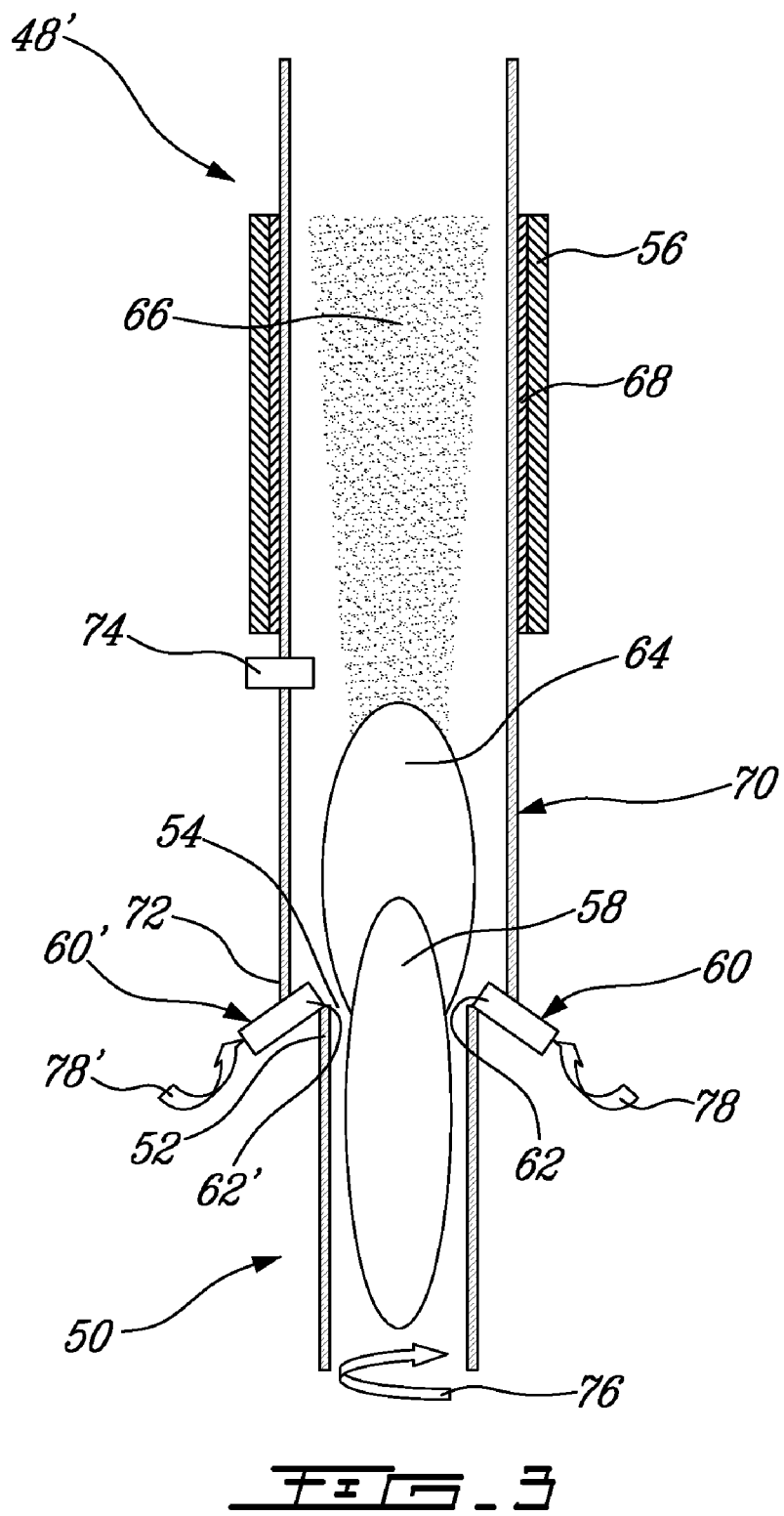
FIG. 3 is a schematic, sectional elevation view of an apparatus for producing single-wall carbon nanotubes, according to a third preferred embodiment of the invention.

The apparatus 48' illustrated in FIG. 3 is similar to the apparatus 48 shown in FIG. 2, with the exception that an additional feed conduit 60' is provided, the feed conduits 60 and 60' being arranged on either side of the plasma tube 52. The conduit 60' has a discharge end 62' disposed adjacent the plasma-discharging end 54 of the plasma tube 52 and serves the same purpose as the feed conduit 60. The carbon-containing gas and the metal catalyst, optionally in admixture with a carrier gas, flow through the conduit 60' along a helical path represented by the arrow 78'. Although two feed conduits 60 and 60' are shown in FIG. 3, it is possible to have a plurality of such conduits disposed symmetrically about the plasma tube 52. Instead of feeding the metal catalyst through the conduits 60 and 60', it is possible to feed only the carbon-containing gas through the conduits 60 and 60' and to feed the metal catalyst in admixture with the inert gas through the plasma tube 52. In such a case, the metal catalyst must be an inorganic metal catalyst to prevent undesirable formation of carbon deposit adjacent the plasma-discharging end 54 of the plasma tube 52. It is also possible to feed the inert gas and an inorganic metal catalyst through the plasma tube 52 and to feed the carbon-containing gas in admixture with an organometallic complex or an inorganic metal catalyst through the conduits 60 and 60'. The plasma tube 52 is also provided with a cooling system (not shown), which preferably uses water. The apparatus 48' further comprises a Faraday shield (not shown) made of a conductive material, preferably aluminium. Optionally, the apparatus 48' can be provided with the electrostatic trap 35 illustrated in FIG. 1.

Figure 4:
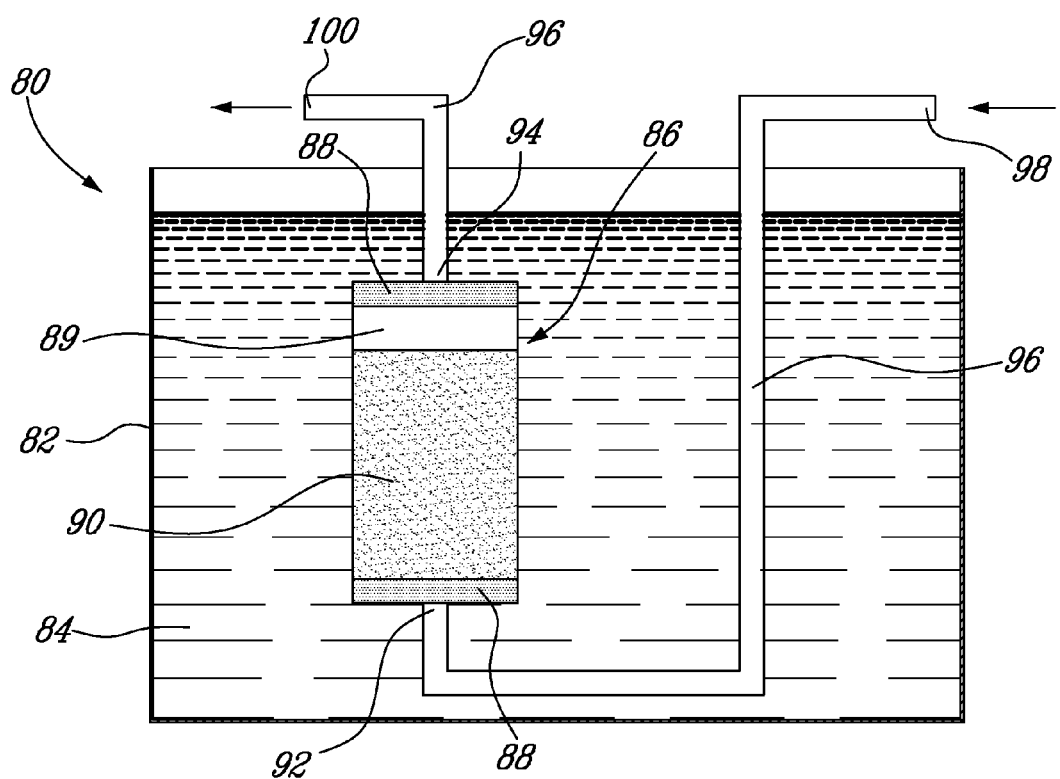
FIG. 4 is a schematic, sectional elevation view of an injecting device according to a fourth preferred embodiment of the invention.

FIG. 4 illustrates an injecting device 80 comprising a reservoir 82 adapted to receive an oil 84, and a reservoir 86 having filters 88. The reservoir 86 is forming a chamber 89 for receiving a metal catalyst 90, preferably ferrocene. The reservoir 86 has an inlet 92 and an outlet 94, which are in fluid flow communication with conduits 96 having an inlet 98 and an outlet 100.

The chamber 89 of the reservoir 86 is provided with a metal catalyst 90 and the catalyst 90 is heated by the hot oil 84 so as to evaporate the metal catalyst 90. A mixture of a carbon-containing gas and a carrier gas (not shown) or a carbon-containing gas is injected at the inlet 98 so as to flow into conduits 96 thereby passing through the reservoir 86 and carrying the evaporated metal catalyst 90 at the outlet 100, which is connected to the apparatus 10, 48 or 48'. The filters 88 prevent solid particles of the metal catalyst 90 from being carried out into said conduits 96.

The following non-limiting example further illustrates the invention.

EXAMPLE

The production or synthesis of single-wall carbon nanotubes has been performed by using a plasma torch as illustrated in FIG. 1. The following experiment has been carried out by the inventors by providing the plasma torch with a cooling system and a Faraday shield. The cooling system prevents the plasma torch from over-heating and being damaged. The Faraday shield comprising a conductive material, preferably aluminium, prevents the electromagnetic radiations from escaping from said apparatus, thereby protecting users of the plasma torch. All the parameters related to the plasma torch are controlled by a computer using the LABVIEW® software. The parameters can also be manually controlled. The inert gas used for generating the primary plasma was argon, the metal catalyst was ferrocene, the carbon-containing gas was ethylene and the cooling gas was helium. Helium was also injected toward the plasma discharging end so as to prevent carbon deposit. The injecting device illustrated in FIG. 4 was used for injecting the ferrocene. Ferrocene was heated to 100° C. and the conduits were heated to 250° C. so as to prevent condensation of ferrocene in the conduit disposed downstream of the reservoir containing the latter metal catalyst. The argon flow varied from 1000 to 3000 sccm (standard cubic centimeters per minute). The helium flows were both stabilized at about 3250 sccm, and the ethylene flow varied between 50 and 100 sccm. The temperature of the oven was kept at 900° C. and measured with a pyrometer. The power of the source generating the electromagnetic radiations (microwaves) was 1000 W and the reflected power was about 200 W. The rod of the electrostatic trap was maintained at a tension of −1000 V. The heat-resistant tubular members were made of quartz. The plasma tube was made of brass. The feed conduit, on the other hand, was made of stainless steel. The metal catalyst (ferrocene) and the carbon-containing substance (ethylene) were used in an atomic ratio metal atoms/carbon atoms of 0.02. The software controlled the flow of the carrier gas, argon, so as to maintain the atomic ratio at such a value. The experiment was carried out at atmospheric pressure under inert conditions (helium and argon).

The synthesis of single-wall carbon nanotubes was performed for a period of 20 minutes using the above-mentioned experimental conditions. During this period of time, 500 mg of the desired single-wall carbon nanotubes were produced. The purity of the nanotubes thus obtained was about 20%.

Figure 5:
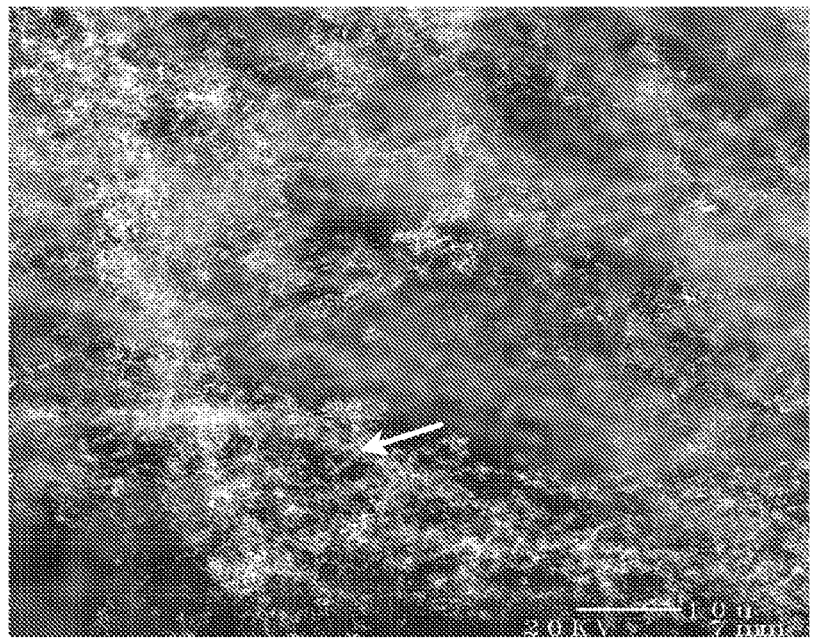
FIG. 5 is a SEM (Scanning Electron Microscope) picture of a crude sample of single-wall carbon nanotubes.
Figure 6:
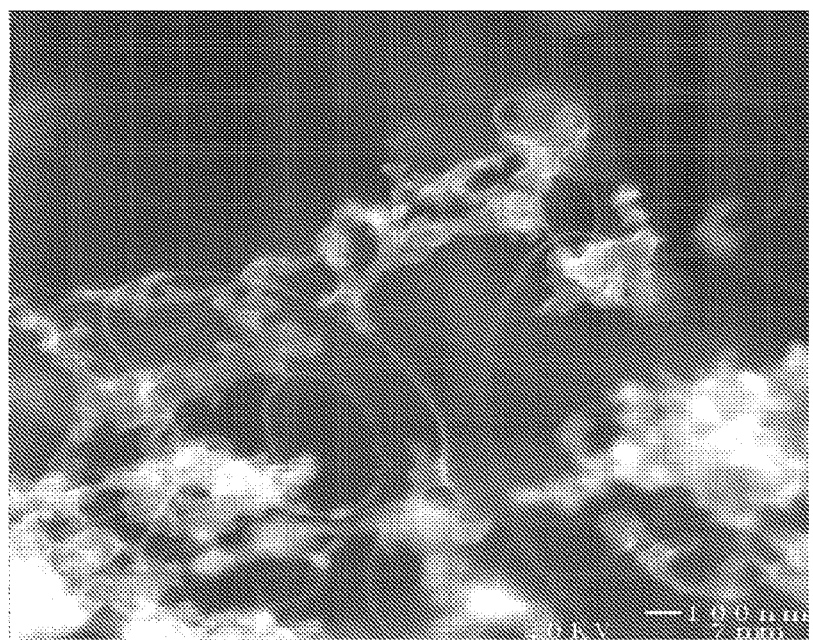
FIG. 6 is another SEM picture of the sample shown in FIG. 5.
Figure 7:
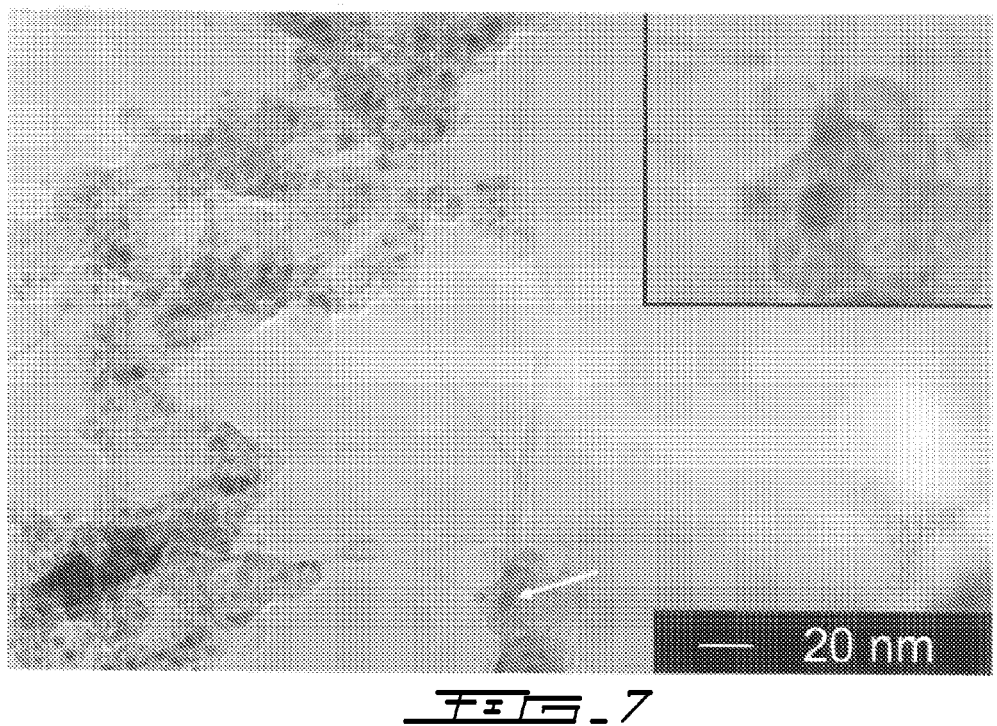
FIG. 7 is a TEM (Transmission Electron Microscope) picture of the sample shown in FIG. 5.
Figure 8:
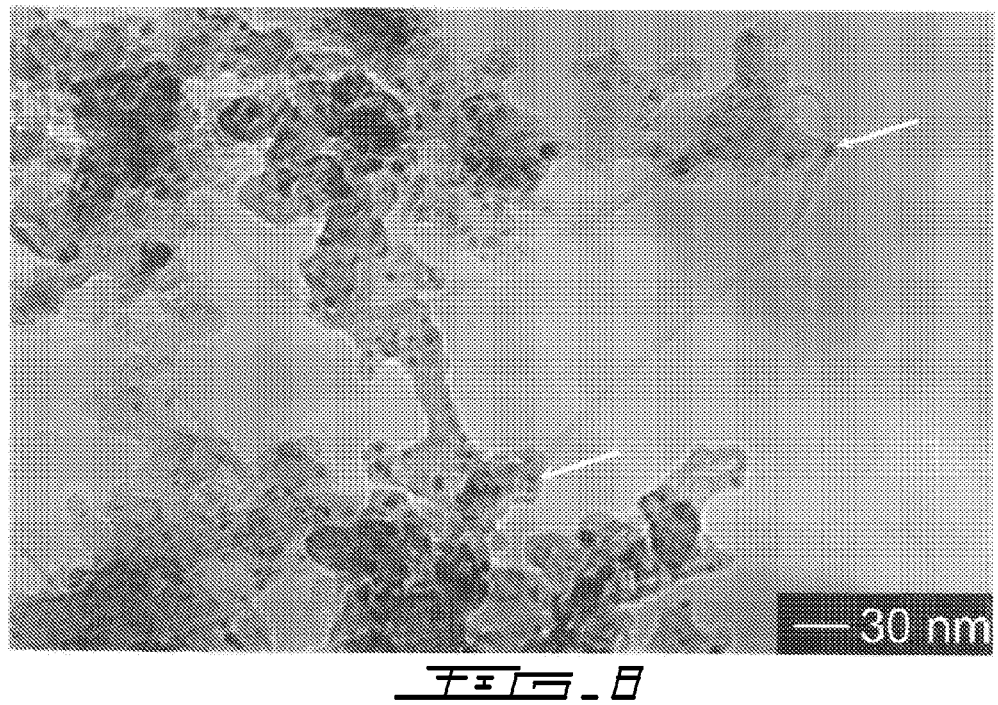
FIG. 8 is another TEM picture of the sample shown in FIG. 5.

The crude sample obtained in the above example was characterized by SEM; the results are illustrated in FIGS. 5 and 6. As it is apparent from FIGS. 5 and 6, single-wall carbon nanotubes were produced. The sample was also characterized by TEM; the results are illustrated in FIGS. 7 and 8. These two figures show that the growth of the single-wall nanotubes is initiated by metal catalyst particles of about 5 nm (indicated by the arrows). The rope-like structure shown in FIGS. 7 and 8 is very common for single-wall nanotubes. The purity of the sample was estimated by comparing the surface occupied by the single-wall carbon nanotubes with the amorphous carbon residues in FIGS. 7 and 8.

Figure 9:
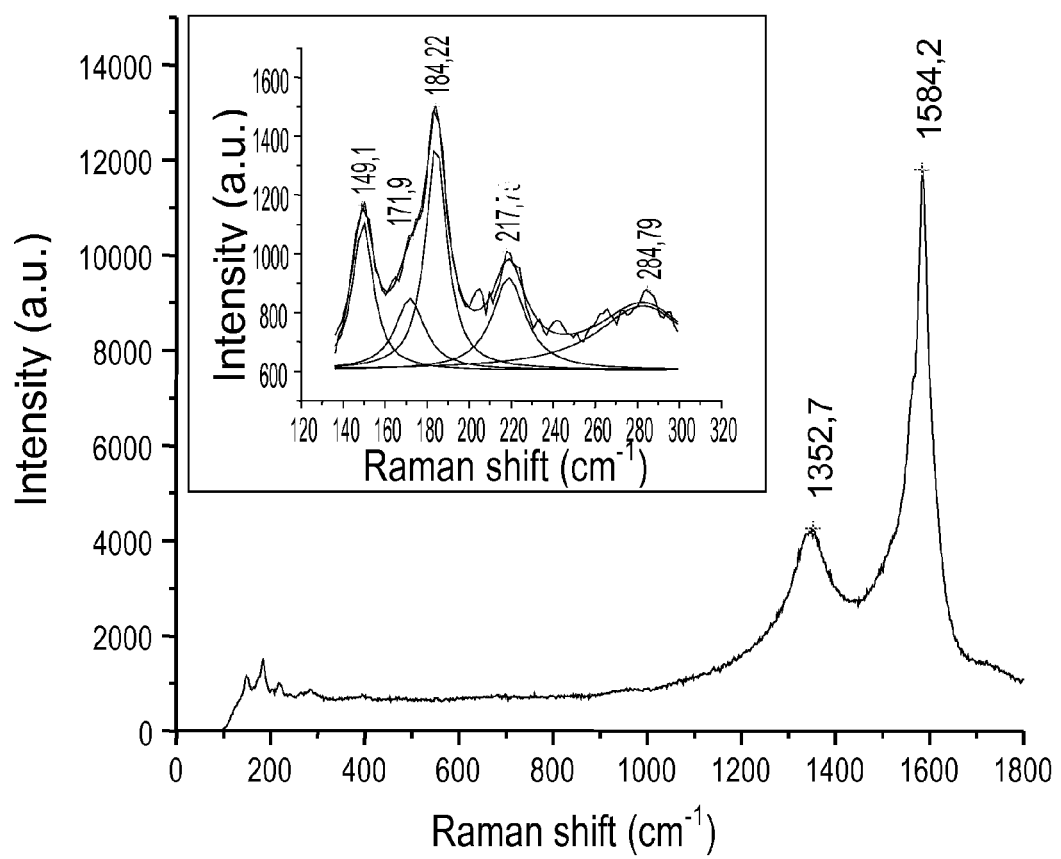
FIG. 9 is the graph of a Raman spectroscopy measurement performed on the sample shown in FIG. 5 using a 514 nm laser.
Figure 10:
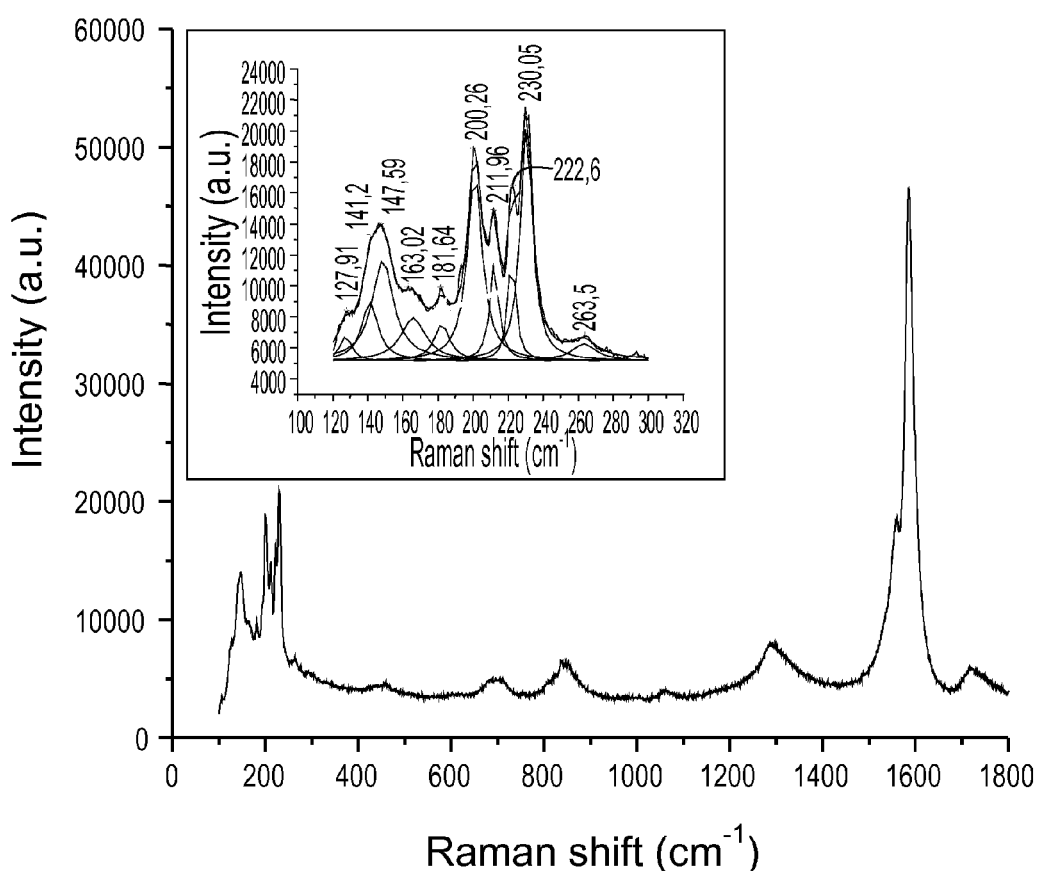
FIG. 10 is the graph of another Raman spectroscopy measurement performed on the sample shown in FIG. 5 using a 782 nm laser.

In order to determine the diameter of the single-wall nanotubes produced according to the above example, two Raman spectroscopy measurements were performed. In the first experiment, a 514 nm laser was used (FIG. 9) whereas, in the second experiment, a 782 nm laser was used (FIG. 10). In FIG. 9, the peaks at 149.10, 171.90, 184.22, 217.75 and 284.79 cm$^{-1}$ correspond to single-wall carbon nanotubes having diameters of 1.50, 1.30, 1.22, 1.03 and 0.80 nm, respectively.

In FIG. 10, the peaks at 127.91, 141.20, 147.59, 163.02, 181.64, 200.26, 211.96, 222.60, 230.05 and 263.57 cm$^{-1}$ correspond to single-wall carbon nanotubes having diameters of 1.75, 1.60, 1.52, 1.37, 1.23, 1.12, 1.06, 1.00, 0.97 and 0.85 nm, respectively.

The above data indicate that in the method according to the example, as opposed to the methods comprising vaporization of graphite, a plurality of single-wall nanotube chiralities was obtained.

It should be noted that by using the method and apparatus of the invention, the production of single-wall carbon nanotubes can be performed for a period of several hours since the deposit of carbon at the plasma-discharging end, leading to the premature extinction of the plasma torch, is avoided.

While the invention has been described with particular reference to the illustrated embodiment, it Will be understood that numerous modifications thereto will appear to those skilled in the art. Accordingly, the above description and accompanying drawings should be taken as illustrative of the invention and not in a limiting sense.

What is claimed is:

1. A method for producing single-wall carbon nanotubes comprising:
   feeding an inert gas through a plasma torch to form an inert gas plasma;
   injecting a carbon-containing substance and a metal catalyst in said inert gas plasma, downstream of said inert gas feed, in order to form a plasma comprising atoms or molecules of carbon and atoms of said metal;
   condensing said atoms or molecules of carbon and said atoms of said metal to form single-wall carbon nanotubes; and
   recovering said single-wall carbon nanotubes.

2. The method of claim 1, wherein the carbon-containing substance and the metal catalyst are separately injected in the inert gas plasma.

3. The method of claim 1, wherein the carbon-containing substance is in liquid or gaseous phase and the carbon-containing substance in liquid or gaseous phase flows along a helical path prior to contacting the inert gas plasma.

4. The method of claim 1, wherein the carbon-containing substance is in admixture with a carrier gas.

5. The method of claim 1, wherein the carbon-containing substance is a $C_1$–$C_4$ hydrocarbon.

6. The method of claim 5, wherein the $C_1$–$C_4$ hydrocarbon is methane or ethylene.

7. The method of claim 1, wherein the metal catalyst is in admixture with a carrier gas.

8. The method of claim 1, wherein a mixture comprising the carbon-containing substance and the metal catalyst is injected in the inert gas plasma.

9. The method of claim 8, wherein the carbon-containing substance and the metal catalyst are in liquid or gaseous phase and the carbon-containing substance and metal catalyst in liquid or gaseous phase flow along a helical path prior to contacting the inert gas plasma.

10. The method of claim 1, wherein the carbon-containing substance and the metal catalyst are in admixture with a carrier gas.

11. The method of claim 1, wherein the metal catalyst comprises at least one metal selected from the group consisting of Fe, Ru, Co, Rh, Ir, Ni, Pd, Pt, Y, La, Ce, Mn, Li, Pr, Nd, Tb, Dy, Ho, Er, Lu and Gd.

12. The method of claim 1, wherein said metal catalyst is ferrocene.

13. The method of claim 1, wherein said metal catalyst comprises cobalt and at least one metal selected from the group consisting of Ni, Fe, Y, Pt, Mo, Cu, Pb and Bi.

14. The method of claim 1, wherein said metal catalyst comprises nickel and at least one metal selected from the group consisting of Fe, Y, Lu, Pt, B, Ce, Mg, Cu and Ti.

15. The method of claim 1, wherein the inert gas is argon.

16. The method of claim 1, further comprising injecting a cooling inert gas downstream of the plasma comprising said atoms or molecules of carbon and said atoms of said metal.

17. The method of claim 1, wherein the metal catalyst and the carbon-containing substance are used in an atomic ratio metal atoms/carbon atoms of about 0.01 to about 0.06.

18. The method of claim 17, wherein the atomic ratio metal atoms/carbon atoms is about 0.02.

19. The method of claim 1, wherein said atoms or molecules of carbon and said atoms of said metal are condensed through a temperature gradient in order to permit a rapid cooling at a rate of at least $10^5$ K/second and obtain a predetermined temperature.

20. The method of claim 19, wherein said atoms or molecules of carbon and said atoms of said metal are maintained at said predetermined temperature in order to obtain single-wall carbon nanotubes.

21. The method of claim 20, wherein said predetermined temperature is comprised between 500 and 1800° C.

22. The method of claim 20, wherein said atoms or molecules of carbon and said atoms of said metal are maintained at said predetermined temperature by means of an oven.

23. A method for producing single-wall carbon nanotubes, comprising:
   feeding an inert gas and an inorganic metal catalyst through a plasma torch to form an inert gas plasma comprising atoms of said metal;
   injecting a carbon-containing substance in said inert gas plasma, downstream of said inert gas feed, in order to form a plasma comprising atoms or molecules of carbon and atoms of said metal; and
   condensing said atoms or molecules of carbon and said atoms of said metal to form single-wall carbon nanotubes.

24. The method of claim 23, wherein the carbon-containing substance is in admixture with a carrier gas.

25. The method of claim 23, wherein the carbon-containing substance is a $C_1$-$C_4$ hydrocarbon.

26. The method of claim 23, wherein the inorganic metal catalyst comprises at least one metal selected from the group consisting of Fe, Ru, Co, Rh, Ir, Ni, Pd, Pt, Y, La, Ce, Mn, Li, Pr, Nd, Tb, Dy, Ho, Er, Lu and Gd.

27. The method of claim 26, wherein the inorganic metal catalyst comprises iron.

28. The method of claim 26, wherein the metal catalyst and the carbon-containing substance are used in an atomic ratio metal atoms/carbon atoms of about 0.01 to about 0.06.

29. The method of claim 23, wherein said atoms or molecules of carbon and said atoms of said metal are condensed through a temperature gradient in order to permit a rapid cooling at a rate of at least $10^5$ K/second and obtain a predetermined temperature.

30. The method of claim 29, wherein said atoms or molecules of carbon and said atoms of said metal are maintained at said predetermined temperature in order to obtain single-wall carbon nanotubes.

31. The method of claim 30, wherein said predetermined temperature is comprised between 500 and 1800° C.

32. The method of claim 1, wherein said produced single-wall carbon nanotubes contain essentially no multi-wall carbon nanotubes.

33. The method of claim 1, wherein said produced single-wall carbon nanotubes contain essentially no fullerenes.

34. The method of claim 1, wherein the carbon-containing substance and the metal catalyst are injected in said inert gas plasma at a plasma-discharging end of said plasma torch or adjacently thereof.

35. A method for producing single-wall carbon nanotubes, comprising:
   forming an inert gas plasma by feeding an inert gas through a plasma torch;
   introducing a carbon-containing substance and a metal catalyst in said inert gas plasma in order to form a plasma comprising atoms or molecules of carbon and atoms of said metal, wherein said carbon-containing substance is introduced in said inert gas plasma downstream of said inert gas feed, in order to avoid a premature extinction of the plasma torch;

condensing said atoms or molecules of carbon and said atoms of said metal to form single-wall carbon nanotubes; and recovering said single-wall carbon nanotubes.

36. the method of claim 35, wherein the carbon-containing substance and the metal catalyst are separately introduced in the inert gas plasma.

37. The method of claim 35, wherein a mixture comprising the carbon-containing substance and the metal catalyst is introduced in the inert gas plasma.

38. The method of claim 35, wherein said produced single-wall carbon nanotubes contain essentially no fullerenes.

39. The method of claim 35, wherein said produced ingle-wall carbon nanotubes contain essentially no multi-wall carbon nanotubes.

40. the method of claim 35, wherein the carbon-containing substance is a $C_1$-$C_4$ hydrocarbon.

41. The method of claim 35, wherein the metal catalyst comprises iron.

42. The method of claim 35, wherein the carbon-containing substance and the metal catalyst are injected in said inert gas plasma at an outlet of said plasma torch or adjacently thereof.

43. The method of claim 1, wherein said carbon-containing substance is injected in said inert gas plasma downstream of said inert gas feed in order to avoid a premature extinction of the plasma torch.

44. The method of claim 1, wherein at least one said carbon-containing substance and said metal catalyst is injected in the inert gas plasma by means of a feeder having an outlet which is disposed inside said plasma torch and downstream of an inert gas inlet of said plasma torch through which said inert gas is fed in said plasma torch to form the inert gas plasma.

45. The method of claim 1, wherein said carbon-containing substance and said metal catalyst are injected in the inert gas plasma by means of a feeder having an outlet which is disposed inside said plasma torch and downstream of an inert gas inlet of said plasma torch through which said inert gas is fed in said plasma torch to form the inert gas plasma.

46. A method for producing single-wall carbon nanotubes comprising:

feeding an inert gas through a plasma torch to form an inert gas plasma;

injecting a carbon-containing substance and a metal catalyst in said inert gas plasma, downstream of said inert gas feed, in order to form a plasma comprising atoms or molecules of carbon and atoms of said metal;

condensing said atoms or molecules of carbon and said atoms of said metal through a temperature gradient in order to permit a rapid cooling at a rate of at least $10^5$ K/second;

maintaining said atoms or molecules of carbon and said atoms of said metal at a predetermined temperature in order to obtain single-wall carbon nanotubes; and recovering said single-wall carbon nanotubes.

47. The method of claim 46, wherein said predetermined temperature is comprised between 500 and 1800° C.

48. The method of claim 46, wherein the predetermined temperature is comprised between 900 and 1800° C.

49. The method of claim 46, wherein said predetermined temperature is comprised between 800 and 1300° C.

50. the method of claim 46, wherein the carbon-containing substance and the metal catalyst are separately injected in the inert gas plasma.

51. the method of claim 46, wherein a mixture comprising the carbon-containing substance and the metal catalyst is injected in the inert gas plasma.

52. The method of claim 48, wherein the metal catalyst comprises at least one metal selected from the group consisting of Fe, Ru, Co, Rh, Ir, Ni, Pd, Pt, Y, La, Ce, Mn, Li, Pr, Nd, Tb, Dy, Ho, Er, Lu and Gd.

53. The method of claim 47, wherein the metal catalyst comprises at least one metal selected from the group consisting of Fe, Co, and Ni.

54. The method of claim 47, wherein the metal catalyst comprises Fe.

55. The method of claim 46, wherein the carbon-containing substance is a $C_1$-$C_4$ hydrocarbon.

56. The method of claim 46, wherein the carbon-containing substance is a carbon-containing solid, said carbon-containing solid being in admixture with a carrier gas.

57. The method of claim 46, wherein the carbon-containing substance and the metal catalyst are injected in said inert gas plasma at an outlet of said plasma torch or adjacently thereof.

58. The method of claim 46, wherein at least of one said carbon-containing substance and said metal catalyst is injected in the inert gas plasma by means of a feeder having an outlet which is disposed inside said plasma torch and downstream of an inert gas inlet of said plasma torch through which said inert gas is fed in said plasma torch to form the inert gas plasma.

59. The method of claim 47, wherein said carbon-containing substance and said metal catalyst are injected in the inert gas plasma by means of a feeder having an outlet which is disposed inside said plasma torch and downstream of an inert gas inlet of said plasma torch through which said inert gas is fed in said plasma torch to form the inert gas plasma.

* * * * *